United States Patent
Ouchi et al.

(10) Patent No.: US 6,189,199 B1
(45) Date of Patent: *Feb. 20, 2001

(54) METHOD OF MANUFACTURING A HOSE COUPLING FROM AN INTERMEDIATE BLANK MATERIAL

(75) Inventors: Koji Ouchi; Tokuju Maeno; Yoshihiro Namekawa; Hideki Hagiwara; Katsuhiro Aoyagi; Norio Tanioka; Kenji Hirose; Hisanobu Kanamaru, all of Ibaraki; Hiroya Murakami, Kanagawa, all of (JP)

(73) Assignee: Hitachi Cable, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/816,216

(22) Filed: Mar. 12, 1997

(30) Foreign Application Priority Data

| Mar. 13, 1996 | (JP) | 8-056321 |
| Mar. 13, 1996 | (JP) | 8-056322 |
| Mar. 13, 1996 | (JP) | 8-056323 |
| Mar. 13, 1996 | (JP) | 8-056324 |
| Apr. 26, 1996 | (JP) | 8-107957 |
| Oct. 24, 1996 | (JP) | 8-282004 |
| Nov. 21, 1996 | (JP) | 8-310913 |
| Nov. 21, 1996 | (JP) | 8-310914 |
| Nov. 21, 1996 | (JP) | 8-310915 |

(51) Int. Cl.$^7$ ................................................. B23P 13/04

(52) U.S. Cl. ................ 29/557; 29/890.14; 29/890.144; 72/267; 285/256

(58) Field of Search ................................. 285/256, 258, 285/259, 422; 29/557, 558, 890.14, 890.15, 890.144; 72/267, 334, 356, 358

(56) References Cited

U.S. PATENT DOCUMENTS

| 3,073,629 | * | 1/1963 | De Marco | 285/256 |
| 3,540,486 | * | 11/1970 | Flounders | 138/109 |
| 3,672,704 | * | 6/1972 | Christianson | 285/256 |
| 3,698,745 | * | 10/1972 | Mundt | 285/256 |
| 4,166,373 | * | 9/1979 | Braun | 72/356 |
| 4,416,139 | * | 11/1983 | Hesse et al. | 72/267 |
| 4,564,223 | * | 1/1986 | Burrington | 285/256 |
| 4,626,006 | * | 12/1986 | Noguchi et al. | 285/158 |
| 4,650,223 | * | 3/1987 | Miyazaki et al. | 285/158 |
| 4,761,873 | * | 8/1988 | Wetzel et al. | 29/517 |
| 4,768,369 | * | 9/1988 | Johnson et al. | 72/368 |
| 5,040,830 | * | 8/1991 | Atkinson | 285/256 |
| 5,321,968 | * | 6/1994 | Poole et al. | 72/306 |
| 5,737,959 | * | 4/1998 | Korbel et al. | 72/362 |
| 5,794,983 | * | 8/1998 | Melvin | 285/55 |
| 5,797,629 | * | 8/1998 | Beagle | 285/256 |
| 5,906,047 | * | 5/1999 | Miller et al. | 29/890.132 |

FOREIGN PATENT DOCUMENTS

| 1 336 376 | 11/1973 | (GB) . |
| 2 147 073 | 5/1985 | (GB) . |
| 2 205 598 | 9/1988 | (GB) . |
| 51-33516 | 9/1976 | (JP) . |
| 55-97838 | 7/1980 | (JP) . |
| 0253133 | * 11/1986 | (JP) | B21D/5/16 |

* cited by examiner

Primary Examiner—S. Thomas Hughes
Assistant Examiner—Essama Omgba
(74) Attorney, Agent, or Firm—McDermott, Will & Emery

(57) ABSTRACT

A method of manufacturing a hose coupling from an intermediate blank material, the hose coupling having an inner tube or tubular nipple portion, an outer tube or tubular sleeve portion and a head portion, all formed by plastic deformation from an intermediate blank material. The head portion is provided with a bore at an end opposite the end where the nipple portion and the sleeve portion are joined. In addition, the head portion is internally provided with a female thread and a conical seal portion.

23 Claims, 20 Drawing Sheets

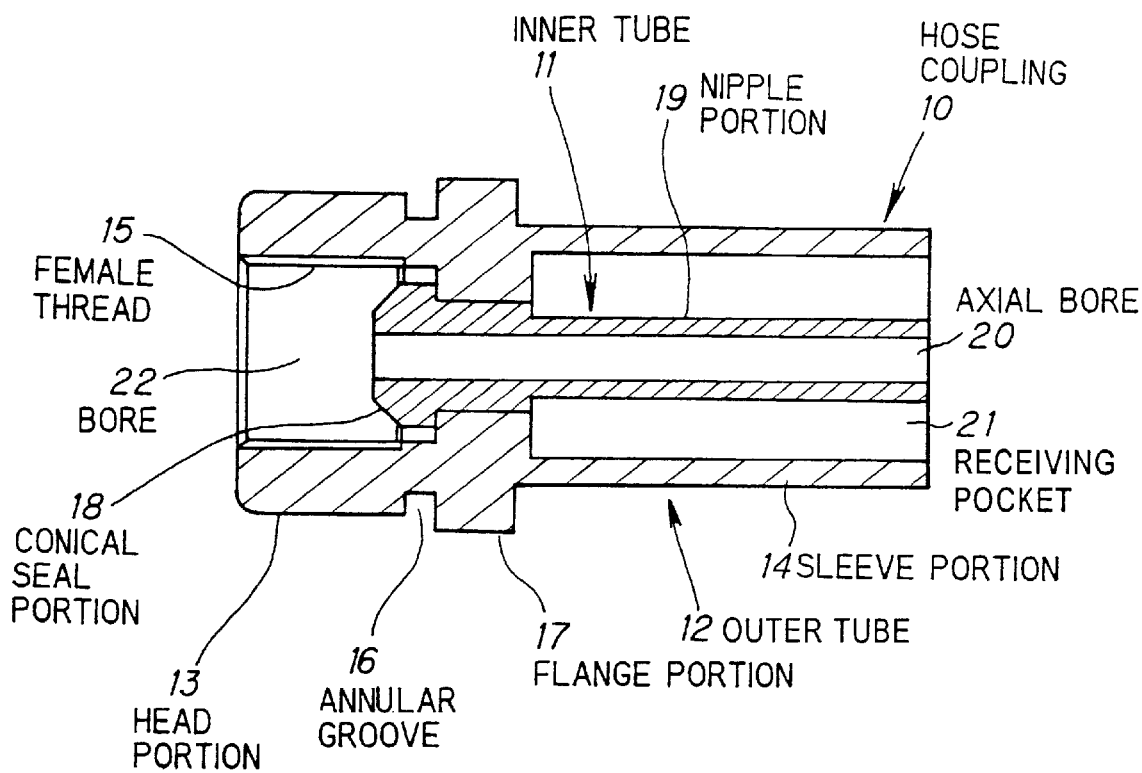

METHOD OF MANUFACTURING A HOSE COUPLING FROM AN INTERMEDIATE BLANK MATERIAL

FIELD OF THE INVENTION

This invention relates to a hose coupling, an intermediate blank material for making the same and a hose assembly using the same, and more particularly to, a hose coupling, an intermediate blank material for making the same and a hose assembly using the same, which is suitable for an industrial hose, such as a brake hose.

BACKGROUND OF THE INVENTION

A hose coupling or hose mouthpiece, such as used in automotive hydraulic brake lines have been used by considering its features of detachability, reliability and leak-proof. A conventional hose coupling comprises a tubular nipple portion having an axial bore, a tubular sleeve portion axially extending over the nipple portion, and a head portion, to one end of which one ends of the nipple portion and the sleeve portion are joined such that the axial bore is provided therethrough. In general the head portion is internally provided with a female thread by which the hose coupling is connected to a nozzle member. These kinds of hose coupling or hose mouthpiece have been produced according to a variety of methods, such as (a) cutting each portion of the hose coupling from a blank material, (b) producing a nipple portion, a sleeve portion and a body portion including a head portion separately and securing the separate parts together by brazing, (c) securing a body portion including a head portion and a separate sleeve portion together by caulking.

According to the first method, however, there are disadvantages in that it is not suitable for mass production because cutting generates a large quantity of chips and its relatively slow operation speed results in high cost. In addition to that, it causes lack of stability in finished dimensions.

The second method of brazing has an advantage in mass production. FIG. 1 shows an example of a conventional hose coupling produced by this method. The hose coupling 10 comprises an inner tube 11 and an outer tube 12 separately. The outer tube 12 includes a head portion 13, a sleeve portion 14 extending from one end of the head portion 13, a female thread 15 internally provided on the side wall of a bore 22 produced on another end of the head portion 13, an annular groove 16 and a flange portion 17 in its periphery. The inner tube 11 comprises a conical seal portion 18, a nipple portion 19, and a flange portion 23 such that an axial bore 20 is provided therethrough, as shown in FIG. 2A. The inner tube 11 is formed by plastic deformation using a former, while the outer tube 12 is usually produced from a round rod or pipe by cutting. The inner tube 11 is inserted into an inner bore 24 of the outer tube 12 (see FIG. 2B) such that the flange portion 23 fits to the inner bore 24, and secured to the outer tube 12 by brazing using copper solder, etc. The sleeve portion 14 and the nipple portion 19 produce a cylindrical receiving pocket 21 in which an end of a hose member is inserted and secured by crimping. FIG. 3 also shows a similar conventional hose coupling, wherein like parts are indicated by like reference numerals as used in FIG. 1. In this case, a step-like annular groove 36 is provided in the periphery of a head portion 13.

Since brazing is done at higher temperature than a melting point of a solder, it is done at 1,100~1,150° C. for copper solder, for example.

According to the second method, however, there are disadvantages set out below.

(1) cutting is necessary to form the nipple portion 11. It generates chips as wastes and the yield of production is not so good.

(2) the nipple portion 19 is so small in its diameter and so long that it takes longer time to produce the axial bore 20. The bore may be oblique, which results in a deterioration of crimping conditions.

(3) at least inner tube 11 and outer tube 12 must be produced separately. The flange portion 23 and the inner bore need to be made in precise dimensions to be fit to each other securely and brazed. It requires more stages for manufacturing and quality management and is not cost-effective.

(4) the heat of brazing anneals the nipple portion 19 and makes it softer. As a result, the nipple portion 19 is easy to collapse when the sleeve portion 14 is crimped together with the hose member.

(5) fluid leak may happen due to an incomplete seal or inappropriate brazing of a joint, such as skipping the stage and falling off of a solder.

(6) the nipple portion 19 may be eccentrically fitted into the inner bore 24, which results in difficulty in inserting an end of a hose member.

According to the third method, securing a body portion and sleeve portion together by caulking, it has been considered that it has advantages of less stages of manufacture, less possibility of nipple collapse and low cost. However, there is disadvantage in that it is more likely that leak of fluid from a joint than in the brazing method, and it does not seem to be practically implemented.

On the other hand, besides the conventional hose couplings having a female thread shown in FIGS. 1 and 3, other types of hose coupling are known.

FIG. 4 shows a conventional hose coupling having a male thread 40, which also comprises an inner tube 41 as a nipple portion, and an outer tube 42, separately. The outer tube 42 includes a head portion 43, a sleeve portion 44 extending from one end of the head portion 43, a male thread 45 externally provided in the periphery of the head portion 43, a flange portion 47 in its periphery. One end of the inner tube or nipple portion 41 is inserted into a bore 46 such that an axial bore 20 is provided therethrough.

FIG. 5 shows a conventional hose coupling having an eye ring 53a, which comprises a inner tube or nipple portion 59, a sleeve portion 54, and a head portion 53. The head portion 53 includes an eye ring 53a which provides an eye opening 53b, and a neck portion 53c to join the eye ring 53a to the sleeve portion 54. One end of the nipple portion 59 is inserted into a hollow portion of the neck portion 53c and joined thereto. FIG. 6 shows a conventional hose which comprises a nipple portion 69, a sleeve portion 64 and a flat head portion 63 having a rectangular shape cross-section. The flat head portion 63 is provided with an opening 67 and a female thread 65 at one end of an axial bore 66, which is bent in L shape inside the flat head portion 63. The nipple portion 69 and the sleeve portion 64 are co-axially attached to a surface on which an opening of another end of the bore 66 is located.

Regardless these variations of head portions, the sleeve portion and nipple portion need to have a different hardness. If sleeve portion is harder than a certain hardness, it may crack due to a crimping work. On the contrary, if the nipple portion is not harder than a certain hardness, it may collapse due to the crimping work, resulting in the possibility of seal deterioration, or deviation of inner diameter of a hose member. According to the conventional hose couplings, the inner tube or nipple portion is made of relatively harder material like chromium-molybdenum steel, while the outer tube or sleeve portion 91 is made of steel. Therefore, there is a disadvantage in that mechanical strength of a female or male thread is insufficient to ensure leakproof of joint between the hose coupling and a nozzle member. Because the female or male thread is internally or externally formed in or on a head portion by like machining, which is made of the same material as the outer tube or sleeve portion, the female or male thread may be not hard enough to avoid breakage or to transfer sufficient stress to a seal portion of the hose coupling.

SUMMARY OF THE INVENTION

Accordingly, it is an object of the invention to provide a hose coupling, an intermediate blank material for making the same, and hose assembly using the same which may be manufactured at lower cost more and suitable for mass production.

It is a further object of the invention to provide a hose coupling and hose assembly using the same which may improve reliability.

It is a still further object of the invention to provide a method of making a hose coupling by which a manufacturing process is simplified and machining process is reduce as much as possible.

It is a still further object of the invention to provide a hose coupling which prevent an inner tube or nipple portion from collapsing by crimping work.

According to the first feature of the invention, a hose coupling, comprises:a tubular nipple portion having an axial bore; a tubular sleeve portion axially extending over the nipple portion; and a head portion, to one end of which the nipple portion and the sleeve portion are joined such that the axial bore is provided therethrough;

wherein the nipple portion, the sleeve portion and the head portion are formed from one blank material, at least the nipple portion is formed by plastic deformation.

According to the third feature of the invention, a coaxial double-tubular structure, comprises:

an inner tubular portion having an axial bore;

an outer tubular portion axially extending over the inner tubular portion; and a base portion, to one end of which the nipple portion and the sleeve portion are joined such that the axial bore is provided therethrough;

wherein the inner tubular portion, the outer tubular portion and the base portion are formed from one blank material, and the inner tubular portion is harder than the outer tubular portion.

According to the fourth feature of the invention, a brake hose coupling assembly, comprises:

a hose member and a hose coupling connected to at least one end of said hose member, the hose coupling comprising:

a tubular nipple portion having an axial bore;

a tubular sleeve portion axially extending over the nipple portion, at least one end of the hose member being inserted into a pocket between the nipple portion and the sleeve portion to be secured; and a head portion, to one end of which the nipple portion and the sleeve portion are joined such that an axial bore is provided therethrough;

wherein the nipple portion, the sleeve portion and the head portion are formed from one blank material, and the nipple portion is harder than the sleeve portion.

According to the fifth feature of the invention, a method of manufacturing a hose coupling from an intermediate blank material by plastic deformation, the intermediate blank material comprising a cylindrical projection portion; a tubular sleeve portion axially extending over the projection portion; and a head portion, to one end of which the projection portion and the sleeve portion are joined; wherein the projection portion, the sleeve portion and the head portion are formed from one blank material; the method comprising the step of;

plastically deforming the projection portion to form a tubular nipple portion.

BRIEF DESCRIPTION OF THE DRAWINGS

The invention will be explained in more detailed in conjunction with the appended drawings, wherein:

FIG. 1 is a cross-sectional view showing a conventional hose coupling,

FIG. 31 is a cross-sectional view showing a hose assembly in a preferred embodiment according to the invention.

DESCRIPTION OF THE PREFERRED EMBODIMENTS

Figure 2A:
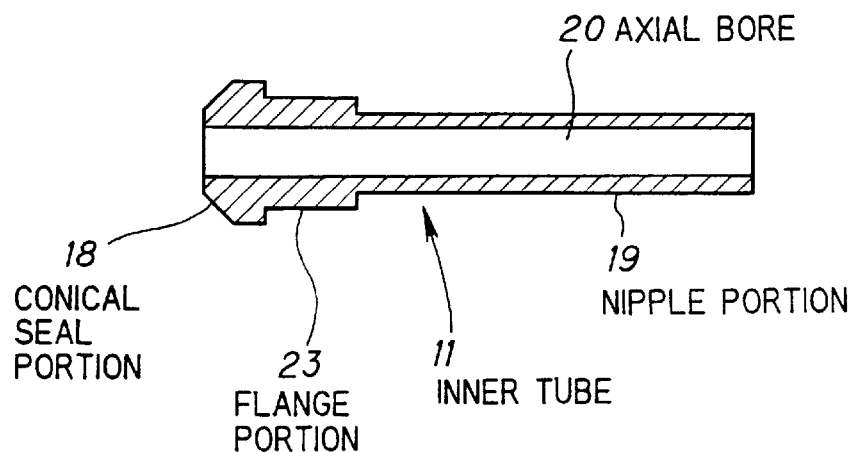
FIGS. 2A and 2B are cross-sectional views showing an inner tube and outer tube used for the conventional hose coupling shown in FIG. 1, respectively.
Figure 2B:
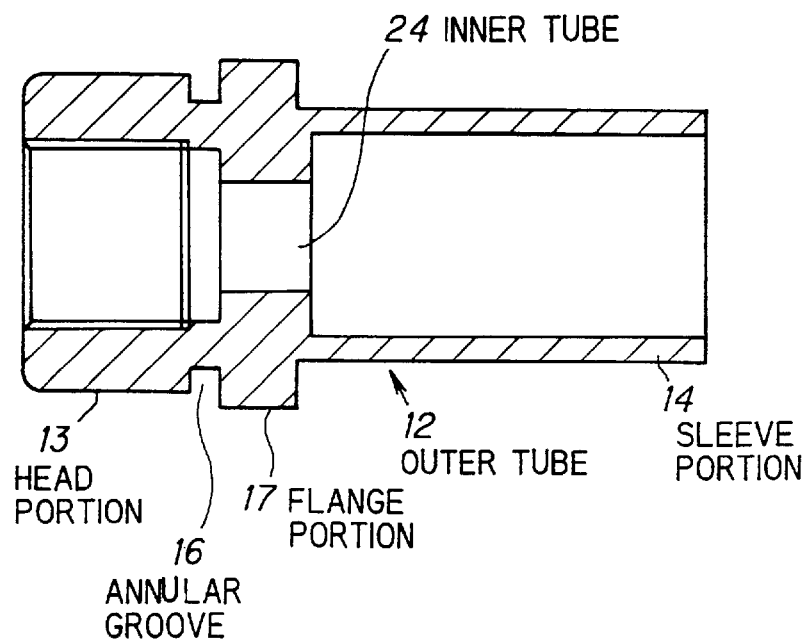
Figure 3:
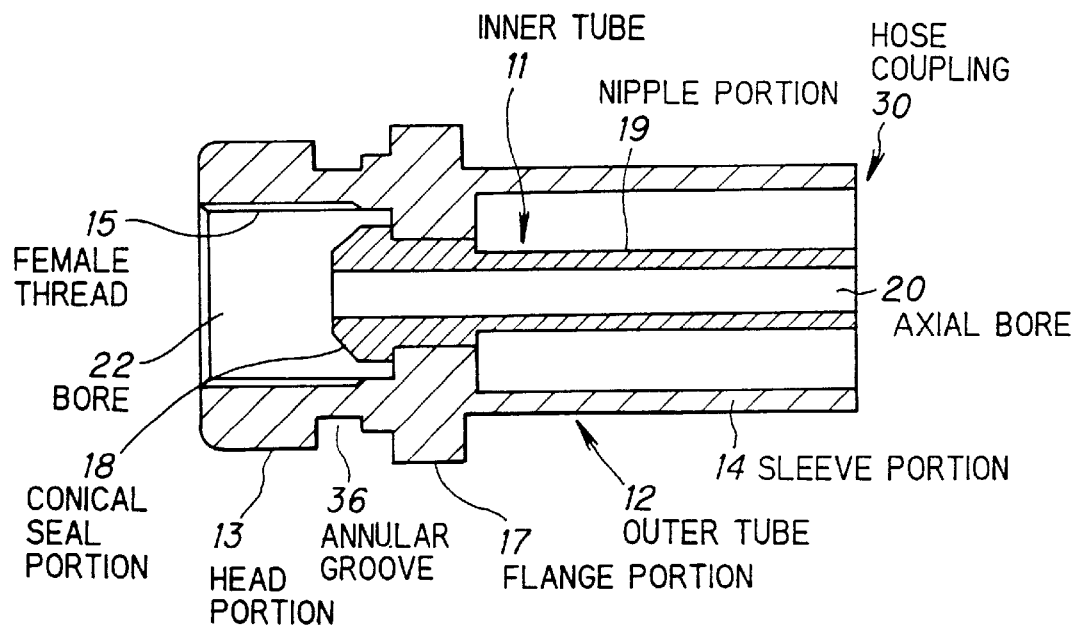
FIGS. 3, 4, 5 and 6 are views similar to FIG. 1, but showing different types of conventional hose couplings, respectively.
Figure 4:
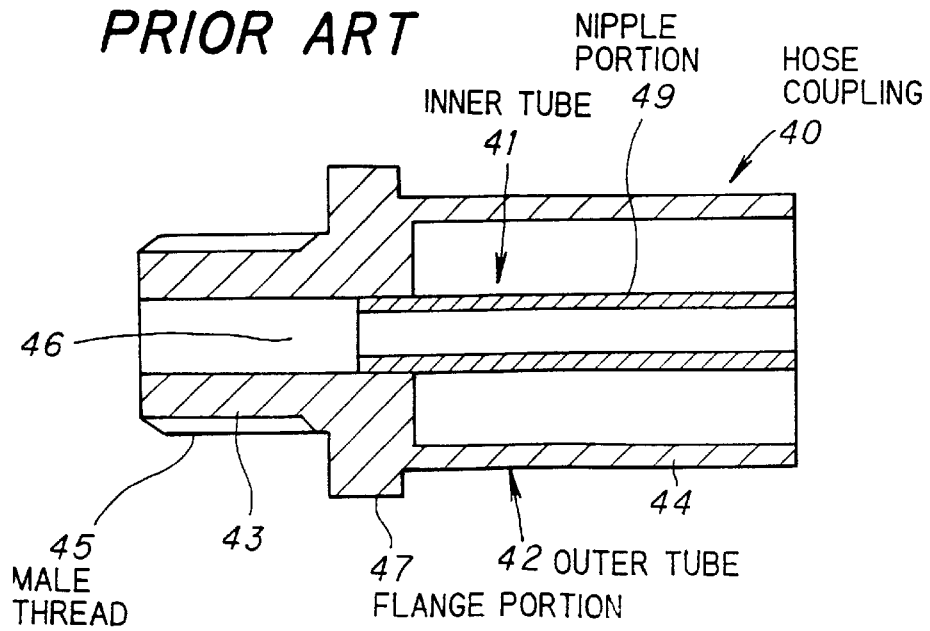
Figure 5:
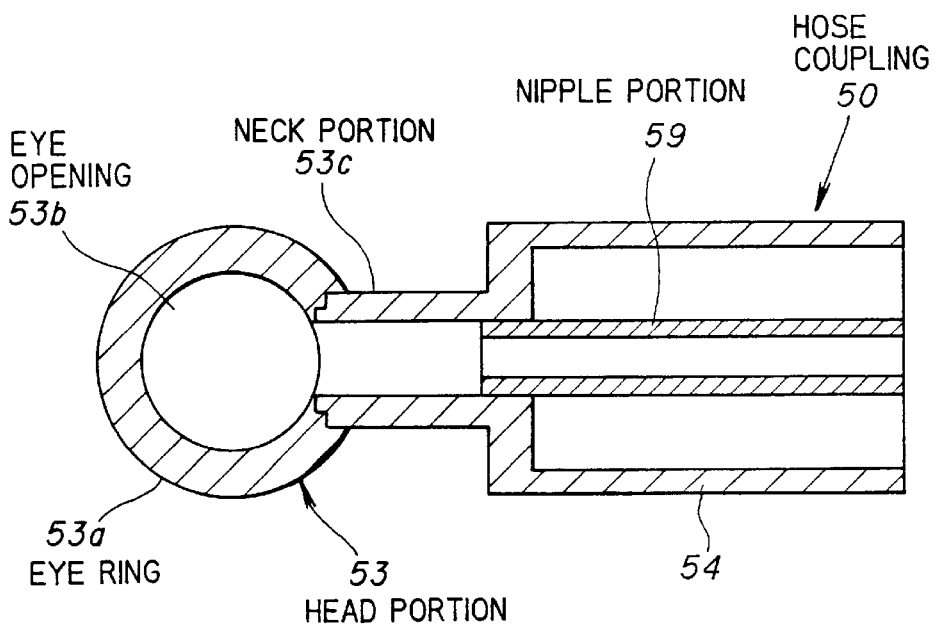
Figure 6:
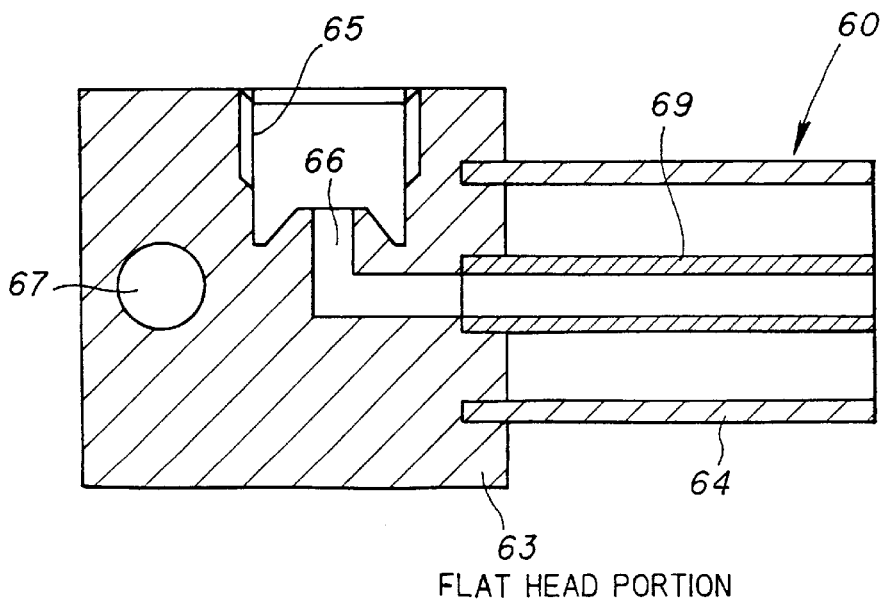

A hose coupling or hose mouthpiece in the first preferred embodiment will be explained in FIG. 7. The hose coupling 100 comprises an inner tube or tubular nipple portion 101, an outer tube or tubular sleeve portion 102 co-axially extending over the nipple portion 101, and a head portion 103. One end of the nipple portion 101 and sleeve portion 102 are joined together to one end of head portion 103 such that an axial bore 110 extends from the nipple portion 101 through the head portion 103. In the invention, the nipple portion 101, sleeve portion 102 and head portion 103 are necessarily formed from one blank material. The head portion 103 is provided with a bore 109 at an end opposite the end where the nipple portion 101 and the sleeve portion 102 are joined. In addition, the head portion 103 is internally provided with a female thread 105 along the periphery of the bore 109 and a conical seal portion 108 at the bottom thereof. The nipple portion 101 is as long as the sleeve portion 102, i.e. L1, and has an axial bore 110, whereby the outside and inside diameters of the nipple portion 101 are d1 and d2, respectively. For example, L1=18 mm, d1=3.5 mm and d2=2.3 mm. The sleeve portion 102 has an inside diameter which properly receive an end of a hose member (not shown) inside a receiving pocket 111 formed by the periphery of the nipple portion 101, an inside wall of the sleeve portion 102 and a central wall portion 104. The head portion 103 is provided with an annular groove 106 and an annular flange portion 107 in its periphery.

In the first preferred embodiment, not only the nipple portion 101, sleeve portion 102 and head portion 103 are necessarily formed from one blank material, but also at least the nipple portion 101 is formed by plastic deformation. More preferably, the other portions including the sleeve portion 102 and head portion 103 also formed by plastic deformation, as understood by the following process of making the hose coupling in the first preferred embodiment.

(a) formation of intermediate blank material

Figure 8A:
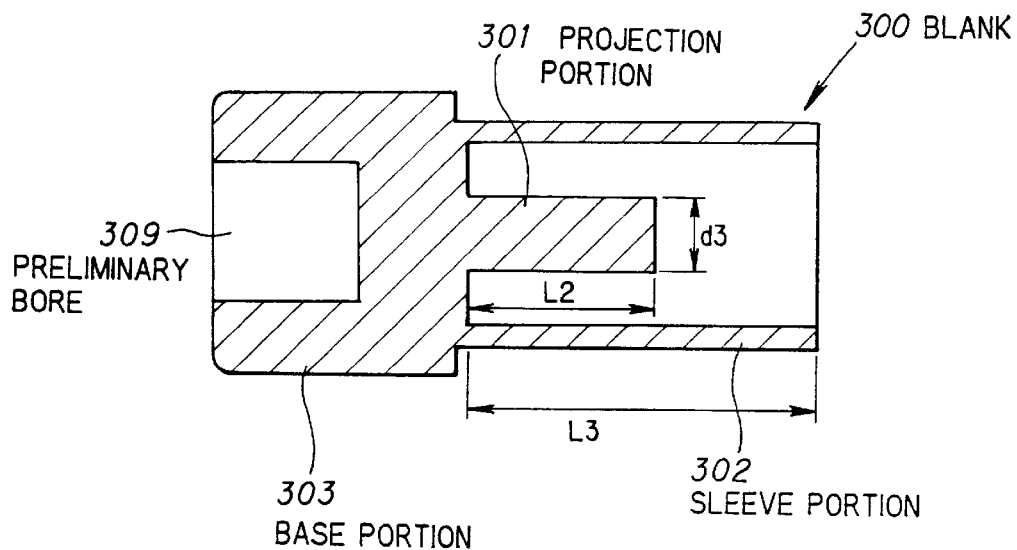
FIGS. 8A, 8B, 8C and 8D are cross-sectional views showing a method of making the hose coupling shown in FIG. 7 using an intermediate blank material in a first preferred embodiment

As a first step, an intermediate blank material 300 as shown in FIG. 8A is formed. The intermediate blank material 300 comprises a cylindrical projection portion 301 to be afterward formed as a tubular nipple portion by plastic deformation, a tubular sleeve portion 302 axially extending over the projection portion 301, and a base portion 303, to one end of which the projection portion 301 and the sleeve portion 302 are joined. The projection portion 301, sleeve portion 302 and head portion 103 are formed from one blank material. The base portion 303 is preferably provided with a preliminary bore 309 at an opposite end of the head portion 103, in which a female thread is formed afterward. The projection portion 301 is shorter than the sleeve portion 302 in their axial lengths, and preferably, the volume and the outer diameter thereof are substantially the same as those of the nipple portion 101 to be formed by plastic deformation afterward. For example, the diameter d3, the length L2 of the projection portion 301 and the length L3 of the sleeve portion 302 are 3.5 mm, 10 mm and 18 mm, respectively. If the intermediate blank material 300 is formed by cold forging, a carbon-steel wire for cold forging (SWCH12 or SWCH15) or equivalents thereof, which are then generally annealed and lubricated, are preferably used as an initial material. The plastic deformation may be performed, such as by a known multistage parts former, however, the intermediate blank material may be produced by machining solely, or combination of plastic deformation and machining.

(b) annealing of intermediate blank material

As a second step, the intermediate blank material 300 is preferably annealed under a predetermined condition, by which the projection portion 301 becomes relatively so soft that it can be easily deformed by plastic deformation at a step followed. The anneal may be performed under the condition that the intermediate blank material 300 is heated at 880° C.~900° C. for approximately 2 hours, then gradually cooled in a furnace for more than 7 hours, so that the Rockwell B hardness thereof is below 60. In addition to the annealing, lubrication may be performed.

(c) formation of nipple portion by plastic deformation

Figure 8B:
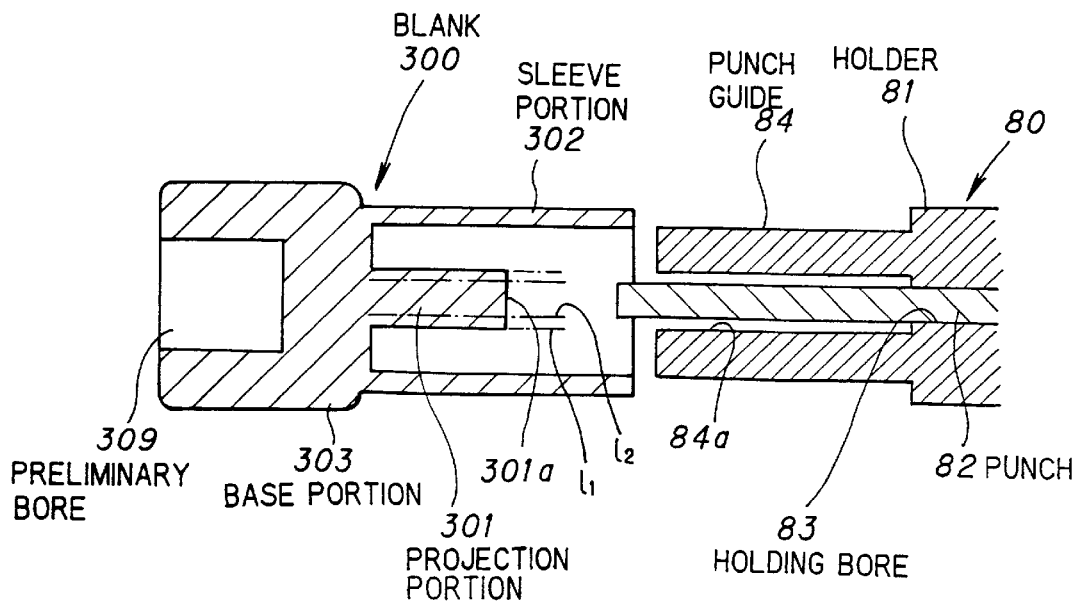

Next, the projection portion 301 is deformed to form the nipple portion 101 by plastic deformation, as shown in FIG. 8B. At this step, a nipple former 80, which comprises a holder 81, a cylindrical punch 82 having extreme hardness, which is supported in the holding bore 83 of the holder 80, and a tubular punch guide 84 extending over the punch 82 from one end of the holder 81, which is to be inserted into the sleeve portion 302 of the intermediate blank material, is used. The punch 82 has the same outer diameter as the diameter d2 of an axial bore of the nipple portion 101. On the other hand, the tubular punch guide 84 has a bore 84a the diameter of which is the same as the outer diameter d3 of the projection portion 301.

For performing the plastic deformation, the nipple former 80 is positioned co-axially with a metallic die (not shown), then both the holder 81 and the punch 82 are moved forward by hydraulic press. If the deformation force of the projection portion 301 is 20 Ton/cm$^2$ for example, the punch 82 is pressed against the tip surface 301a of the projection portion 301 with a force of approximately 1 Ton. The punch 82 forms an axial bore in the projection portion 301, and simultaneously, extrudes the projection portion 301 into the guide hole 84a (as shown in FIG. 8B by one-dotted lines 11 and 12), i.e., a spacing between the outer wall of the punch 82 and the inner wall of the punch guide 84 backward so that the nipple portion 101 is obtained. In other words, the nipple portion 101 is formed by plastic deformation by performing a backward extrusion toward the holder 81, which functions as a receptacle. The press may be performed by multiple steps of pressing. Moreover, the tip surface 301a is preferably perpendicular to the axis of the projection portion 301 so as to prevent the punch 84 from breaking by its obliquility.

(d) punching, formation of seal portion and flange portion

Figure 8C:
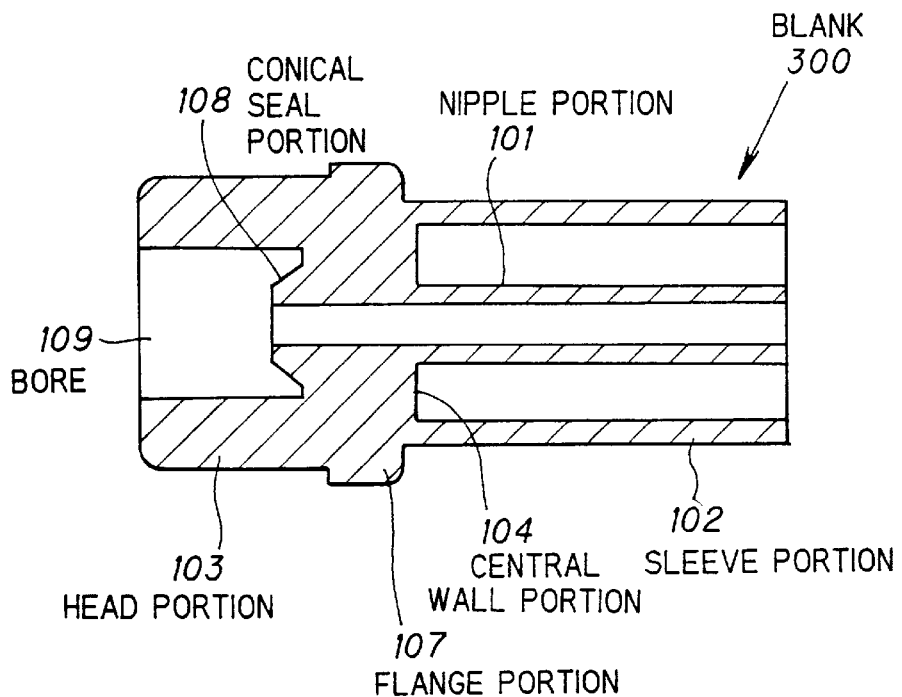

In the formation of the nipple portion 101, the central wall portion is punched through toward the bottom surface of the preliminary bore 309. The punch may be performed by not only using an another hydraulic press machine, but also using the nipple former 80, wherein the punch 82 can move backward and forward against the holder to punch the central wall portion 104. At the same time, the conical seal portion 108 may preferably formed. For example, the seal portion may be formed by plastic deformation simultaneously by shaping the die (not shown) in a certain form. In addition, the flange portion 107 may be formed in the periphery of the base portion 303 by die forging or punching. Then, the hose coupling before machining work as shown in FIG. 8C is obtained.

(e) machining

Next, the female thread 105 and the annular groove are formed by using such as a NCI machine tool, and an automatic lathe. As shown in FIG. 8D, the female thread having a length of L4 (e.g. about 10 mm) and an inner diameter of d4 (e.g. about 9 mm) is formed by using a tap (not shown). In addition to that, the conical seal portion is finished so that it has a conical angle θ (e.g. 84 degrees) and the base thereof has a diameter d5 (e.g. 7.5 mm) which is properly bigger than the diameter of the axial bore 110. The seal portion may be formed by machining. Finally, the hose coupling 100 shown in FIG. 7 is obtained.

According to the above mentioned method of making a hose coupling, due to the most suitable combination of a cold forging process of the head portion 103 and sleeve portion 102 and that of the nipple portion 101, the hose coupling can be manufactured with stable dimensions, through less stages of work. Therefore, the method is suitable for mass production. Moreover, Since the cutting process is limited to a small part of whole process like the formation of the female thread 105, the generation of chips can be minimized.

Moreover, according to the method explained above, the hose coupling 100 has significant features in that the nipple portion 101 is harder than the sleeve portion 102 by backward extrusion through plastic deformation (for example, the nipple portion has a hardness of 90~95 Rockwell B scale), whereby it is not likely to collapse by crimping work of a hose member (not shown). On the other hand, since the sleeve portion 102 becomes softer by annealing before the nipple formation (for example, the sleeve portion has a hardness of 55~60 Rockwell B scale), an end of the hose member (not shown) is easy to be attached to the hose coupling 100. Because of the structure of the hose coupling which is made from one blank material without brazing or caulking, leakproof thereof is more improved. Therefore, it may be applicable to high pressure hydraulic lines.

According to the backward extrusion of the nipple portion in the above mentioned method, although the ratio of punch diameter (d2) to growth length (L1) is about 8, which is larger than an usual ratio (5~6), it is understood by persons skilled in the art that the backward extrusion is performed by applying a high-precision hydraulic press, high-precision die, and a punch having an extreme hardness, etc. Moreover, the method may be generally applied to a method of making a coaxial double-tubular structure having a similar structure, which including an inner tube portion and an outer tubular portion. The blank material from which the hose coupling is formed may includes copper, aluminum, and alloy comprising such metals.

Figure 7:
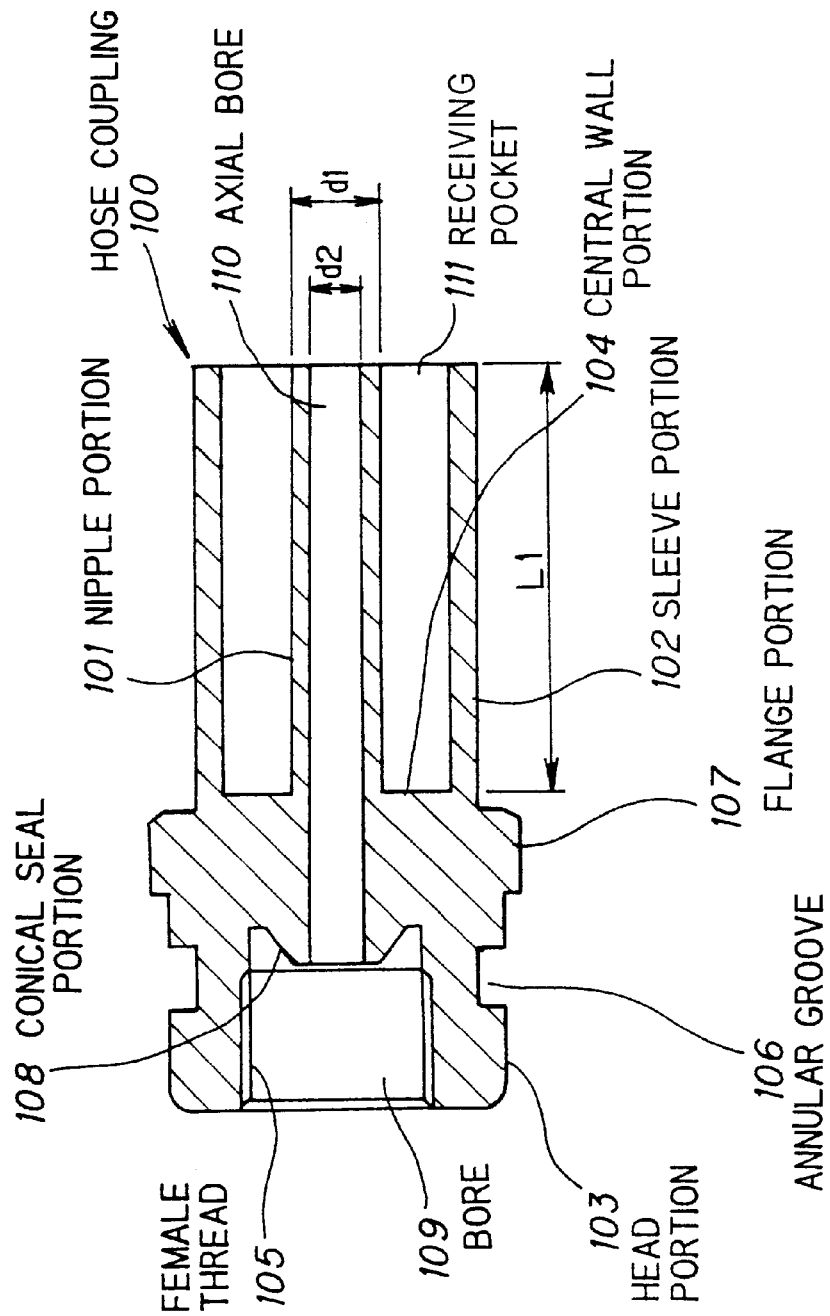
FIG. 7 is cross-sectional view showing a hose coupling in a first preferred embodiment according to the invention.
Figure 8D:
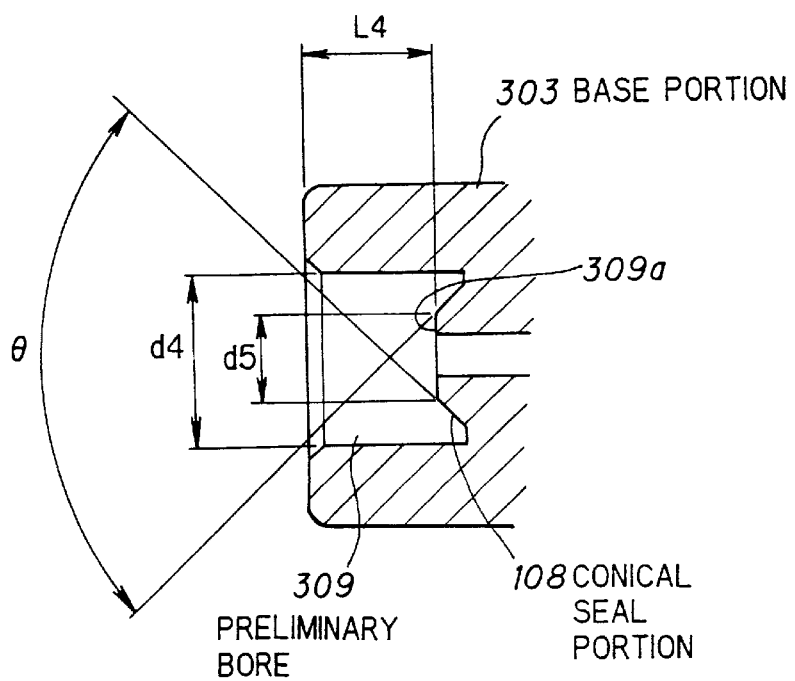
Figure 9:
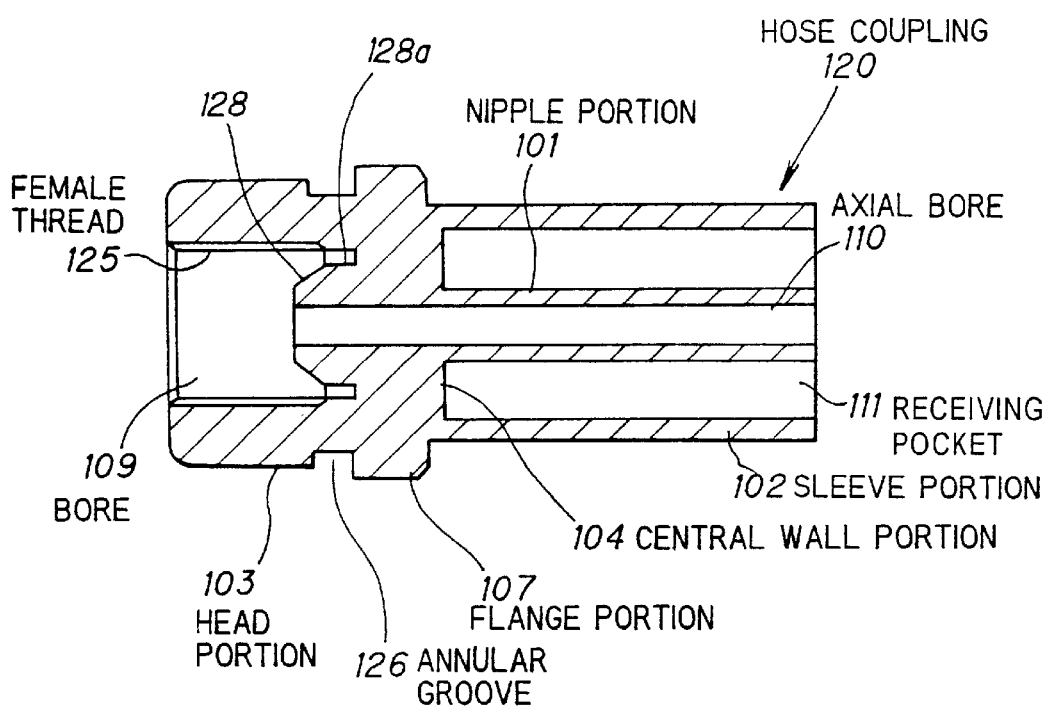
FIG. 9 is a cross-sectional view showing a hose coupling in a second preferred embodiment according to the invention.

FIG. 9 shows a hose coupling in a second preferred embodiment according to the invention, wherein like parts are indicated by like reference numerals as used in FIG. 7. In the second preferred embodiment, a conical seal portion 128 protrudes toward the opening of the bore 109 through a short cylindrical portion 128a, whereby the tip surface of the conical seal portion 128 crosses an distal end of a female thread 125.

Figure 10A:
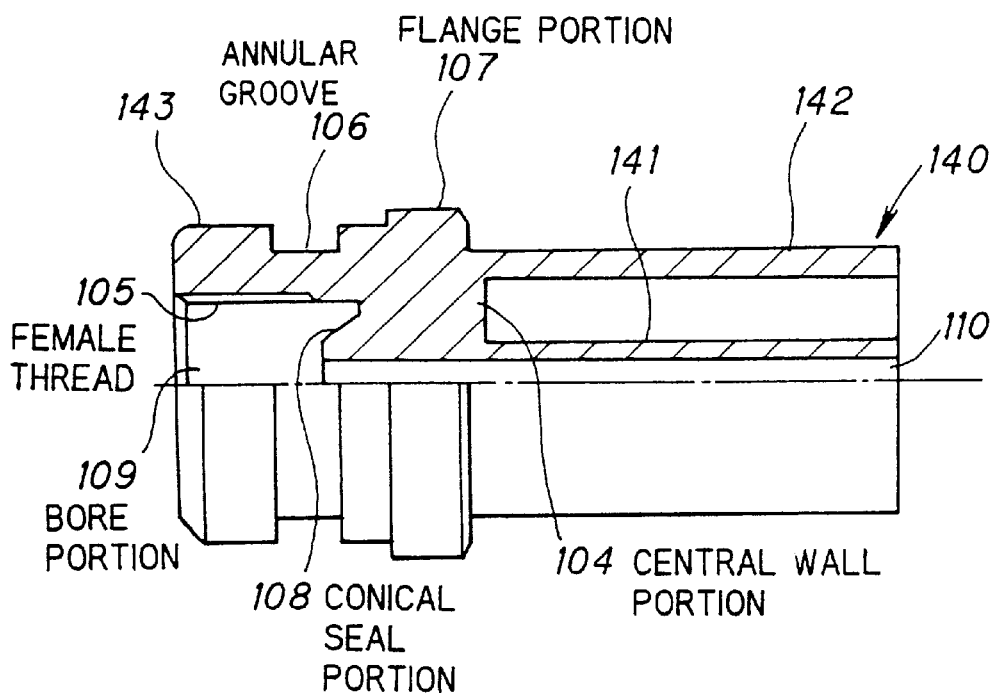
FIGS. 10A and 10B are cross-sectional views showing a hose coupling in a third preferred embodiment according to the invention.
Figure 10B:
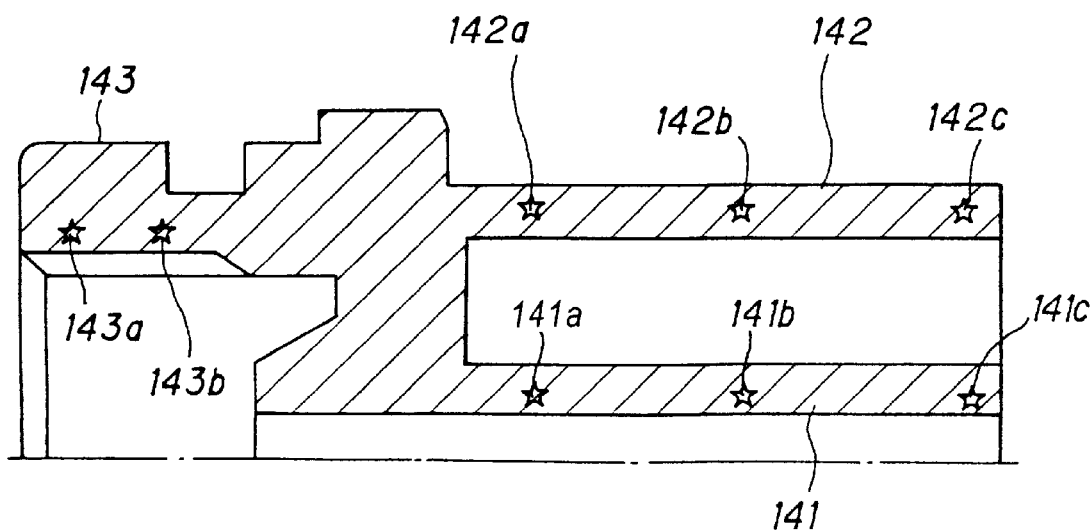

FIG. 10A shows a hose coupling in a third preferred embodiment according to the invention, wherein like parts are indicated by like reference numerals as used in FIGS. 7 and 8. In the hose coupling 140, the hardness of a nipple portion 141, sleeve portion 142 and a head portion 143 in the vicinity of a female thread 105 differs from each other. As indicated in FIG. 10B, the nipple portion 141 at points 141a, 141b and 141c has the hardness of more than 160 Hv Vickers scale, preferably 160 Hv~240 Hv, and more preferably, 170 Hv~190 Hv. The sleeve portion at points 142a, 142b and 142c has the hardness of less than 150 Hv Vickers scale, more preferably, 90 Hv~150 Hv. The head portion 143 in the vicinity of the female thread 105 has the hardness of 120 Hv~180 Hv Vickers scale, more preferably, 150 Hv~170 Hv. As a result, the nipple portion 141 is harder than the sleeve potion 142, and the head portion 143 in the vicinity of the thread portion 105 is harder than the sleeve portion 142. Preferably, the conical seal portion 108 has substantially the same hardness as the head portion 143 in the vicinity 143a, 143b of the female thread 105, which is 150 Hv~170 Hv Vickers scale.

The hose coupling in the third preferred embodiment can be manufactured through a process which is similar to that for manufacturing the first preferred embodiment explained above.

(a) formation of intermediate blank material

As a first step, an intermediate blank material such as shown in FIG. 8A is formed by the same procedure as in the first preferred embodiment.

(b) annealing of intermediate blank material

As a second step, the intermediate blank material is necessarily annealed under a predetermined condition, by which the projection portion becomes relatively so soft that it can be easily deformed by plastic deformation at a step followed, and the hardness of the sleeve portion 142 is to be as hard as 90~150 Hv Vickers scale, for example.

(c) formation of nipple portion by plastic deformation

Next, the projection portion is deformed to form the nipple portion 141 by plastic deformation, such as shown in FIG. 8B. At this step, the nipple portion 141 is formed by plastic deformation by performing a backward extrusion, through which the nipple portion 141 is to be as hard as 160~240 Hv Vickers scale, for example.

(d) punching, formation of seal portion and flange portion

The formation of the nipple portion is followed by punching through the central wall portion 104, and preferably, at the same time, formation of the conical seal portion 108 by plastic deformation. Due to work hardening of the formation, the seal portion 108 has the hardness of 150~170 Hv Vickers scale. For example, the seal portion may be formed by plastic deformation simultaneously by shaping the die (not shown) in a certain form. In addition, the flange portion 107 is formed by plastic deformation simultaneously or through an additional step. On the other hand, the female thread 105 is formed by plastic deformation by a tap. Since the formation is performed after the annealing step, the head portion 143 in the vicinity of the female thread 105 is hardened to be as hard as 120~180 Hv Vickers scale.

(e) machining

Finally, the annular groove 106 are formed by usirfg such as a NCI machine tool, and an automatic lathe.

According to the hose coupling in the third preferred embodiment, since the nipple portion 141 and the sleeve portion are formed from one blank material and the former is harder than the latter, leakproof is improved and the nipple portion 141 is not likely to collapse by crimping work to a hose member. Therefore, it is also suitable for high pressure hydraulic lines. Moreover, since the head portion 143 in the vicinity of female thread is harder than the sleeve portion 142, the thread is not likely to break, and coupling strength is improved. Although the hose coupling having a female thread is disclosed in the third preferred embodiment, the invention may be applied to other types of hose coupling having a different type of head portion, as shown in FIGS. 11, 12, 13 and 14.

Figure 11:
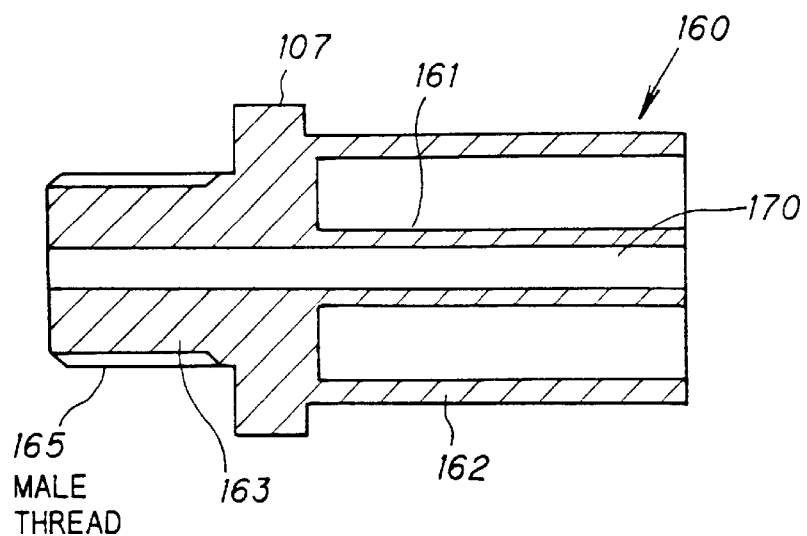
FIG. 11 is a view similar to FIG. 7, but showing a hose coupling in a fourth preferred embodiment according to the invention.

FIG. 11 shows a hose coupling in a fourth preferred embodiment according to the invention. The hose coupling 160 has a male thread 165 in the periphery of the head portion 163 and an axial bore 170 is provided through a nipple portion 161 and the head portion 163. The nipple portion 161, sleeve portion 162 and head portion 163 are made from one blank material, and the hardness of the nipple portion 161, sleeve portion 162 and head portion 163 in the vicinity of the male thread 165 is properly determined according to the invention. In the embodiment, the male thread may be formed by plastic deformation.

Figure 12:
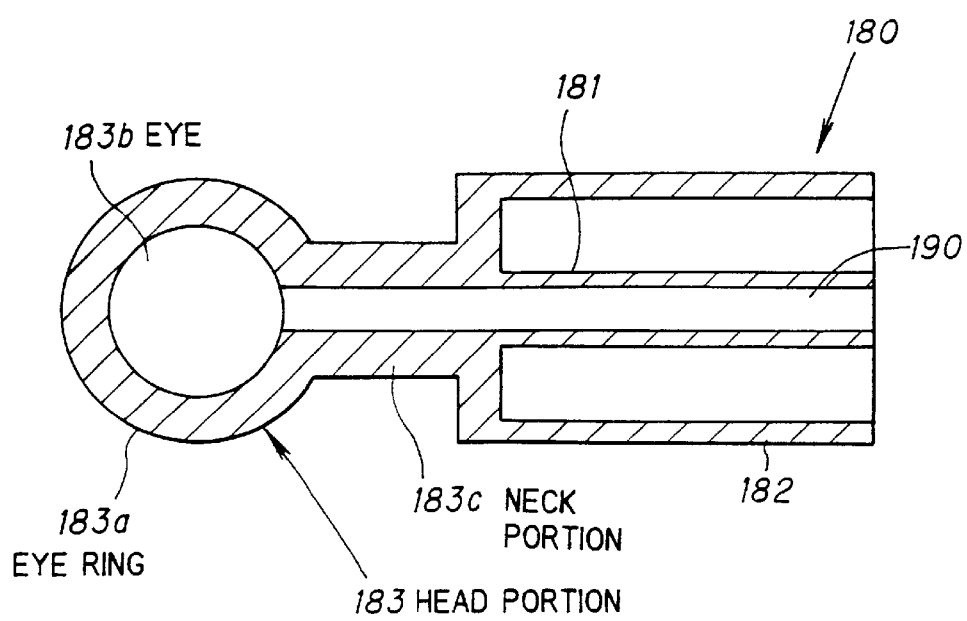
FIG. 12 is a view similar to FIG. 7, but showing a hose coupling in a fifth preferred embodiment according to the invention.

FIG. 12 shows a hose coupling in a fifth preferred embodiment according to the invention. The hose coupling 180 comprises a nipple portion 181, a sleeve portion 180, and a head portion 183, which are formed from one blank material. The head portion 183 includes an eye ring 183a which provides an eye opening 183b, and a neck portion 183c to join the eye ring 183a to the sleeve portion 182. An axial bore 190 extends through the nipple portion 181 and the neck portion 183c. In the embodiment, the sleeve portion 182, nipple portion 181 and head portion 183 have the hardness of 90~150 Hv, 150~250 Hv and 90~250 Hv Vickers scale, respectively.

For manufacturing the hose coupling in the fifth preferred embodiment, an intermediate blank material is formed from a blank material of low-carbon steel which contains about 0.08~0.20% carbon, then annealed under a predetermined condition by which the hardness of the sleeve portion becomes 90~150 Hv Vickers scale. Next, the nipple portion 181 is formed by plastic deformation, through which the hardness thereof becomes 150~250 Hv Vickers scale due to work hardening. Regarding the head portion 183, the hardness of 90·150 Hv Vickers scale may be obtained by almost finishing the shape before annealing, while that of 150·250 Hv Vickers scale may be obtained by forming the eye ring by plastic deformation starting from a sphere portion of an intermediate blank material, or forming the eye opening by plastic deformation by punching a head portion of an intermediate blank material.

Figure 13:
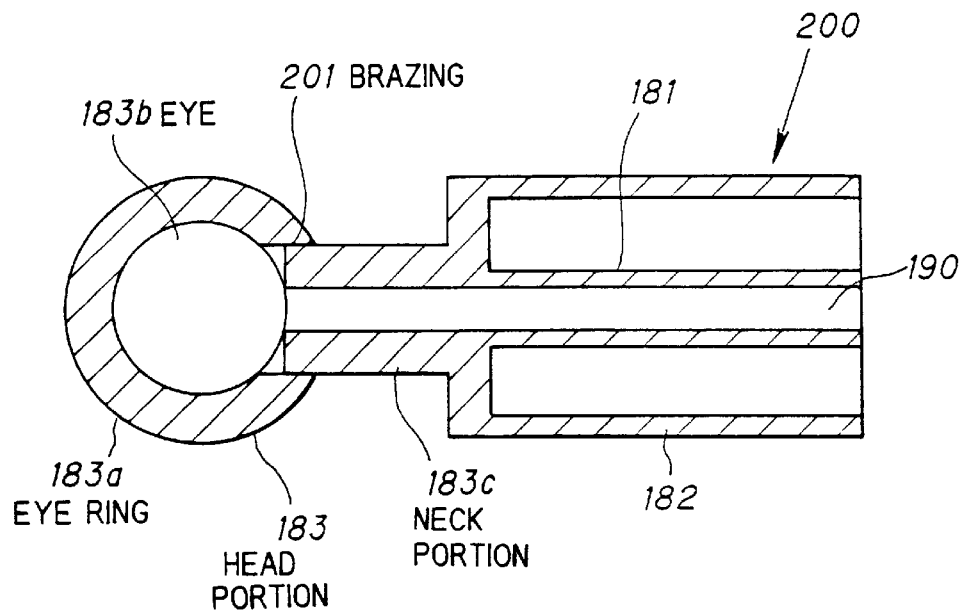
FIG. 13 is a view similar to FIG. 7, but showing a hose coupling in a sixth preferred embodiment according to the invention.

FIG. 13 shows a hose coupling in a sixth preferred embodiment according to the invention, which is a modification of the fifth preferred embodiment. The hose coupling 200 comprises a nipple portion 181, a sleeve portion 182, and a head portion 183 including an eye ring 183a and a neck portion 183c. The nipple portion 181, the sleeve portion 182 and the neck portion 183c of the head portion are formed from one blank material by plastic deformation, while the eye ring 183a is formed by cutting or cold forging and connected to the neck portion 183c by brazing or like.

Figure 14:
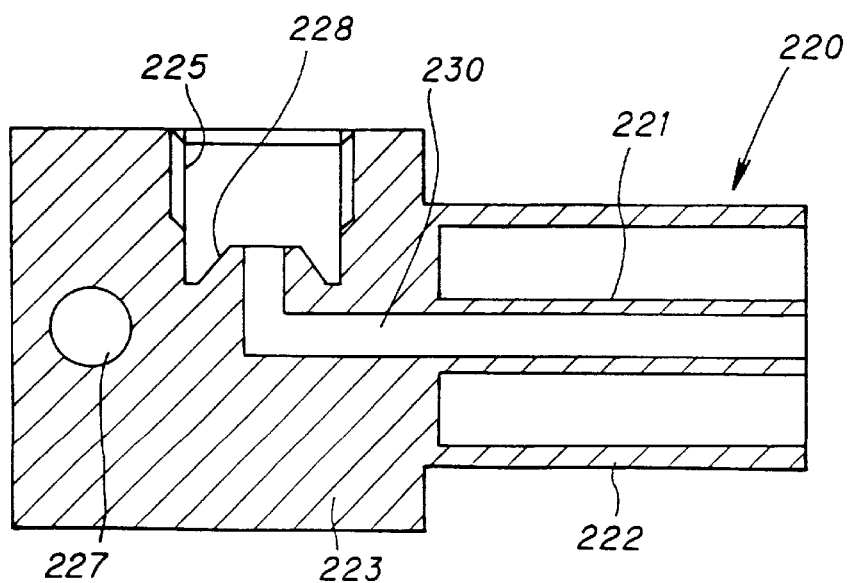
FIG. 14 is a view similar to FIG. 7, but showing a hose coupling in a seventh preferred embodiment according to the invention.

FIG. 14 shows a hose coupling in the seventh preferred embodiment according to the invention, the hose coupling 220 comprises a nipple portion 221 having an axial bore 230, a sleeve portion 220 and a flat head portion 223 having a rectangular shape cross-section. The flat head portion 223 is provided with an opening 227 and a female thread 225 and a conical seal portion 228 at one end of the axial bore 230, which extends therethrough and bends in L shape inside the flat head portion 223. The nipple portion 221, the sleeve portion 222 and the flat head portion 223 are formed from one blank material, and the hardness of the nipple portion 221, the sleeve portion 222 and the flat head portion 223 in the vicinity of the female thread 225 differs from each other according to the invention.

Besides the intermediate blank material in the abovementioned preferred embodiments according to invention, such as shown in FIG. 8, a variety of modification of intermediate blank material may be possible as explained below.

Figure 15:
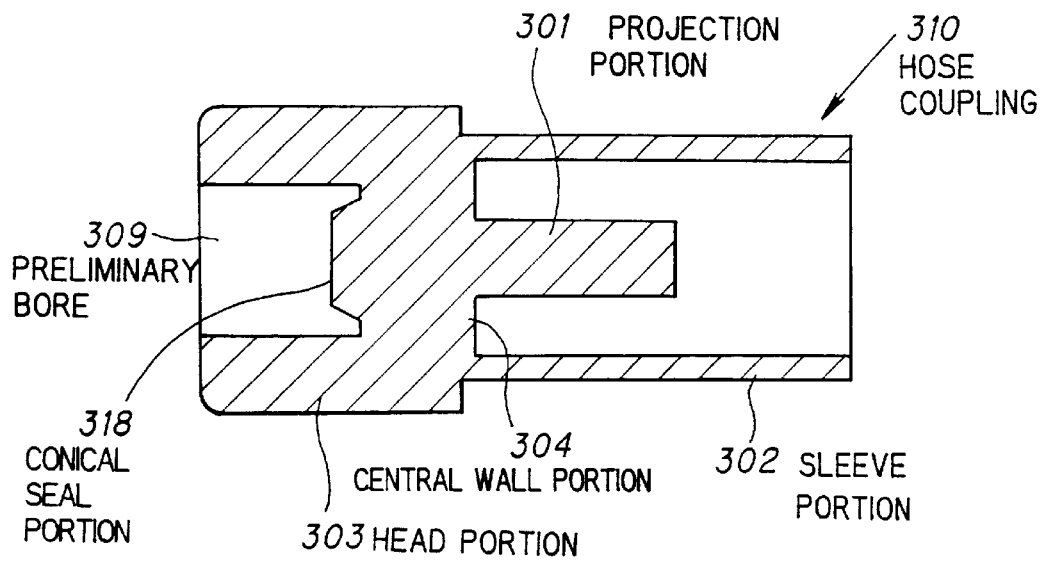
FIGS. 15 through 31 are views similar to FIG. 8A, but showing intermediate blank materials in a second through seventeenth preferred embodiments according to the invention, respectively.

FIG. 15 shows an intermediate blank material in a second preferred embodiment according to the invention, wherein a tapered conical seal portion 318 is formed in advance at the bottom of a bore 309 provided in a head portion 303.

Figure 16:
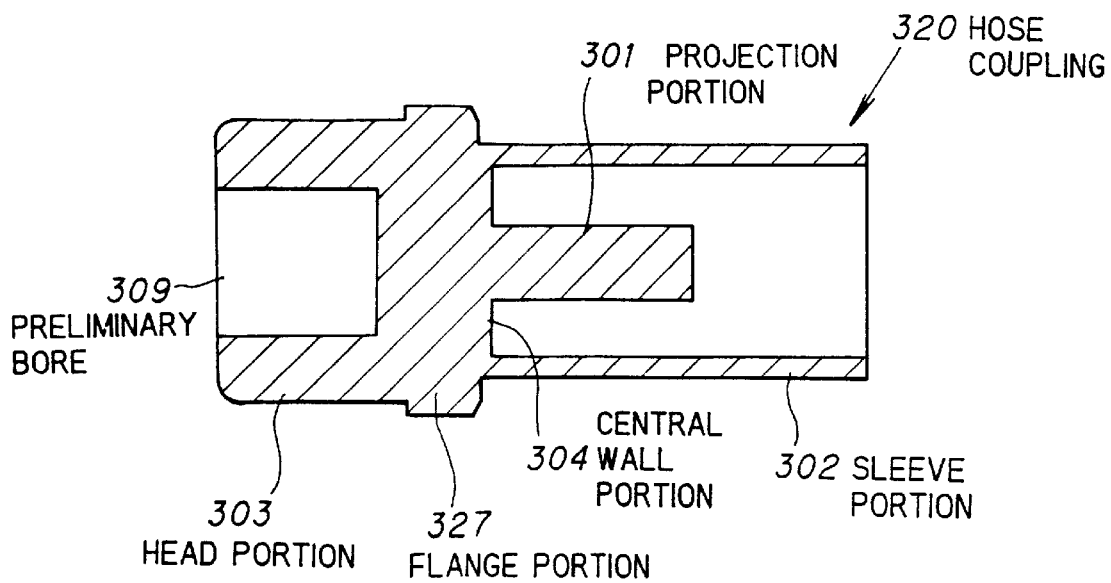

FIG. 16 shows an intermediate blank material in a third preferred embodiment according to the invention, wherein an annular flange portion 327 is formed in advance in the periphery of a head portion 303.

Figure 17:
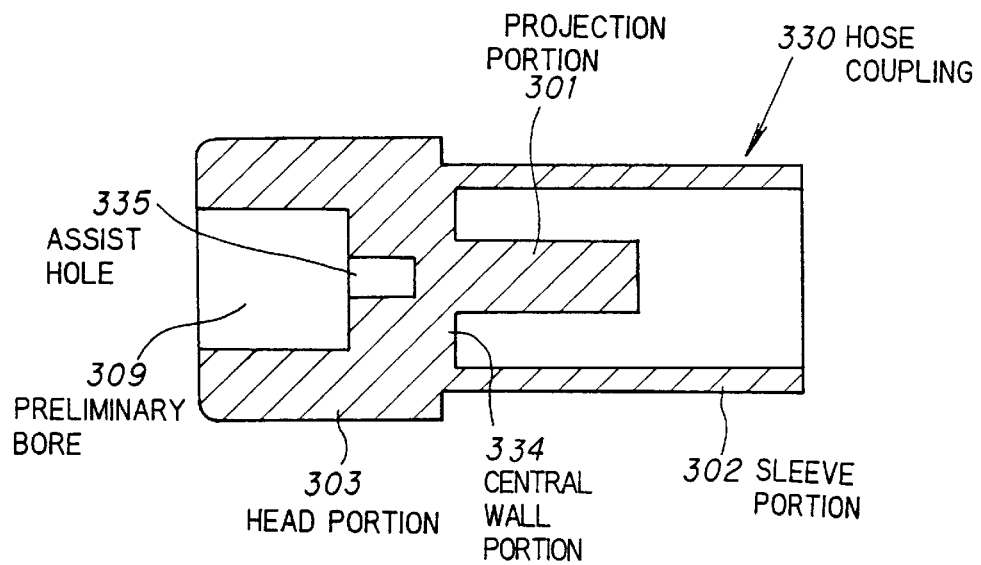

FIG. 17 shows an intermediate blank material in a fourth preferred embodiment according to the invention, wherein a predetermined depth of assist hole 335 is provided at the bottom of the preliminary bore 309 against a central wall potion 304 with an inner diameter which corresponds to the diameter of an axial bore. According to the embodiment, punching of the axial bore through the central wall portion 334 becomes easier.

Figure 18:
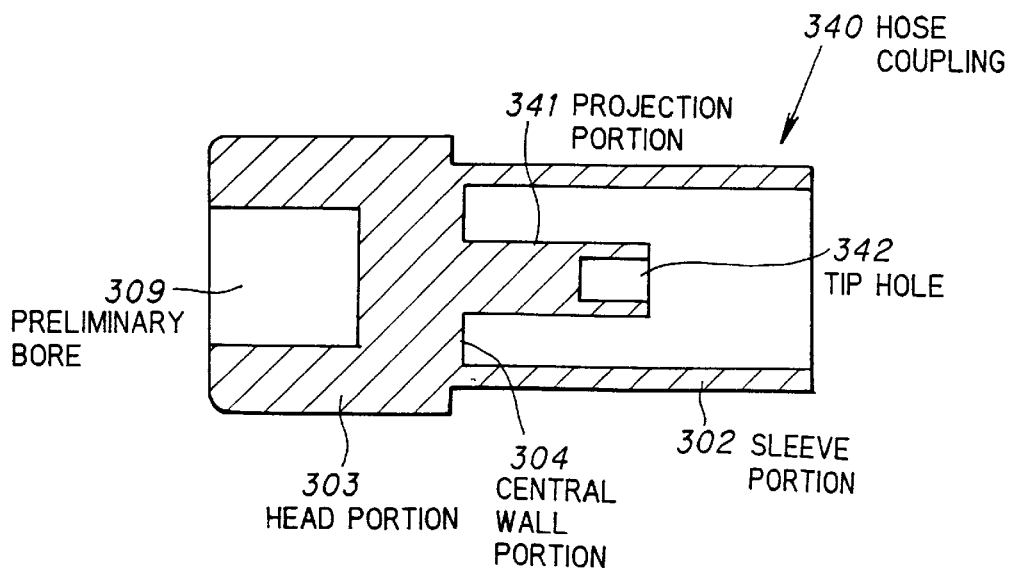

FIG. 18 shows an intermediate blank material in a fifth preferred embodiment according to the invention, wherein a predetermined depth of tip hole 342 is provided at the tip of a projection portion 341. In this case, the length of the projection portion is formed longer than the previous embodiments by the volume of the tip hole 342. According to the embodiment, pushing a punch into the projection portion for backward extrusion becomes easier.

Figure 19:
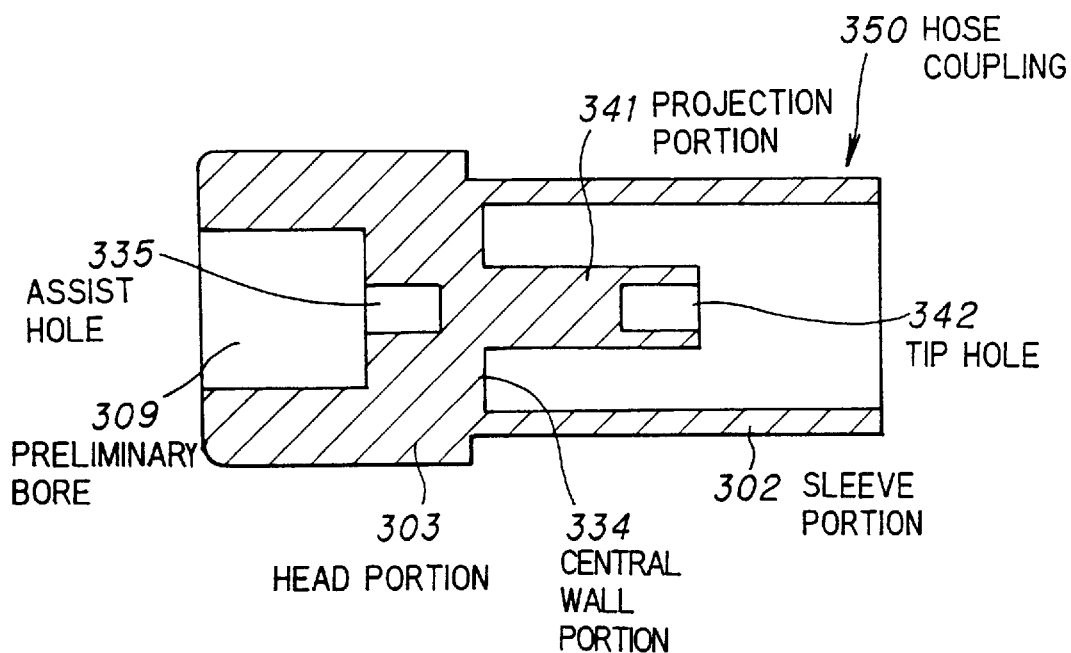

FIG. 19 shows an intermediate blank material in a sixth preferred embodiment according to the invention, wherein both a predetermined depth of assist hole 335, as shown in FIG. 17, and a predetermined depth of tip hole 342, as shown in FIG. 18, are provided. According to the embodiment, both punching of the axial bore through the central wall portion 334 and pushing a punch into the projection portion for backward extrusion become easier.

Figure 20:
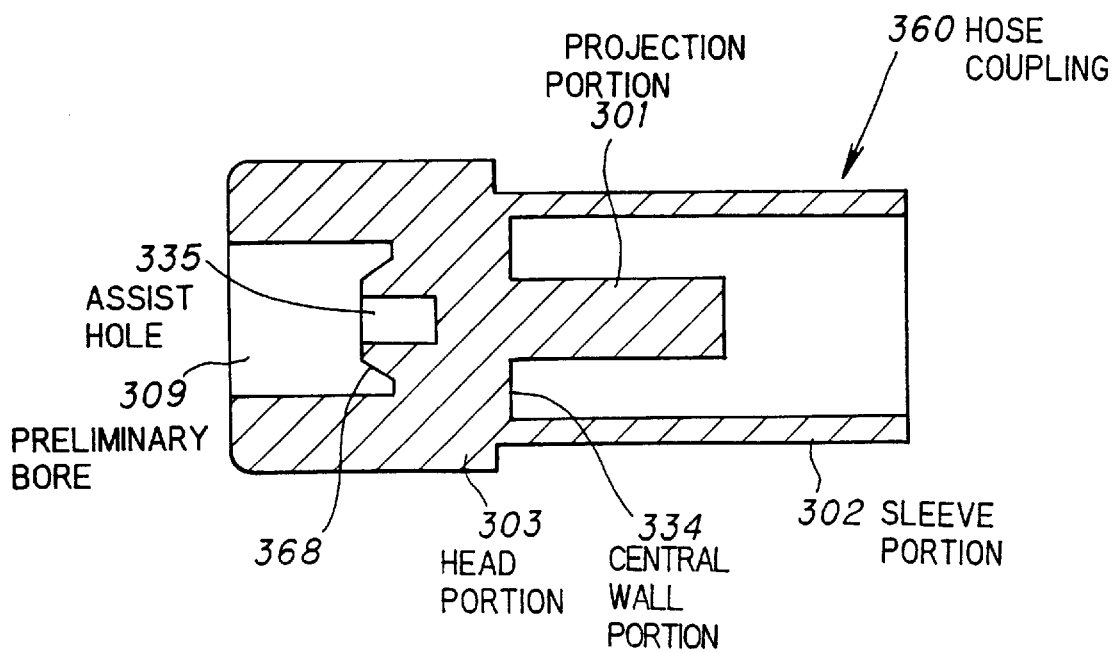

FIG. 20 shows an intermediate blank material in a seventh preferred embodiment according to the invention, wherein a tapered conical seal portion 368 is provided with an assist hole 335.

Figure 21:
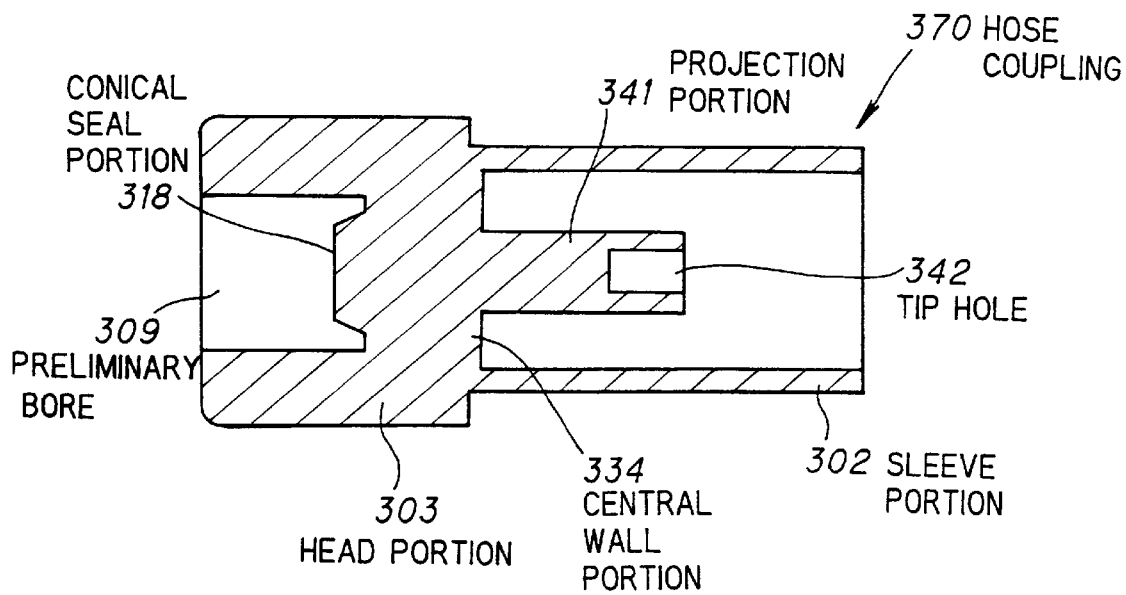

FIG. 21 shows an intermediate blank material in a eighth preferred embodiment according to the invention, wherein a tapered conical seal portion 318 and a tip hole 342 at the tip of a projection portion 341 are provided.

Figure 22:
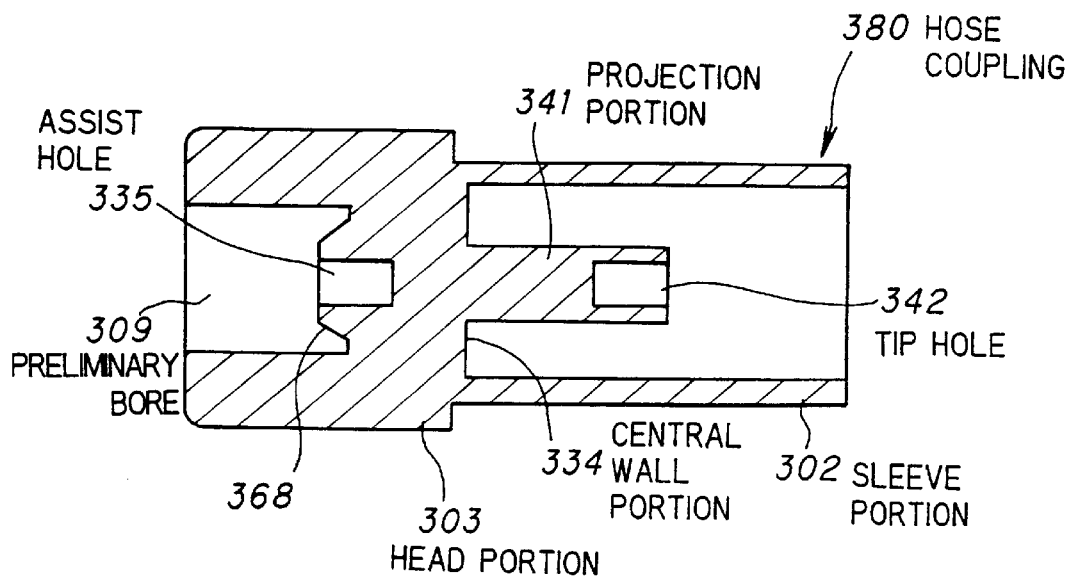

FIG. 22 shows an intermediate blank material in a ninth preferred embodiment according to the invention, wherein a tapered conical seal portion 368 having an assist hole 335 and a tip hole 342 at the tip of a projection portion 341 are provided.

Figure 23:
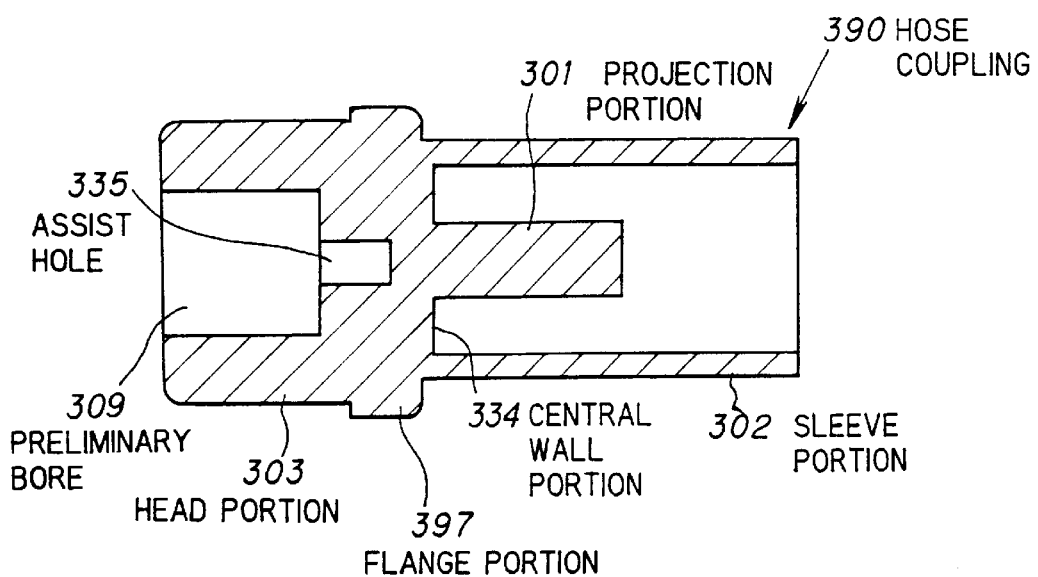

FIG. 23 shows an intermediate blank material in a tenth preferred embodiment according to the invention, wherein an assist hole 335 and a flange portion 397 in the periphery of the head portion 303 are provided in advance.

Figure 24:
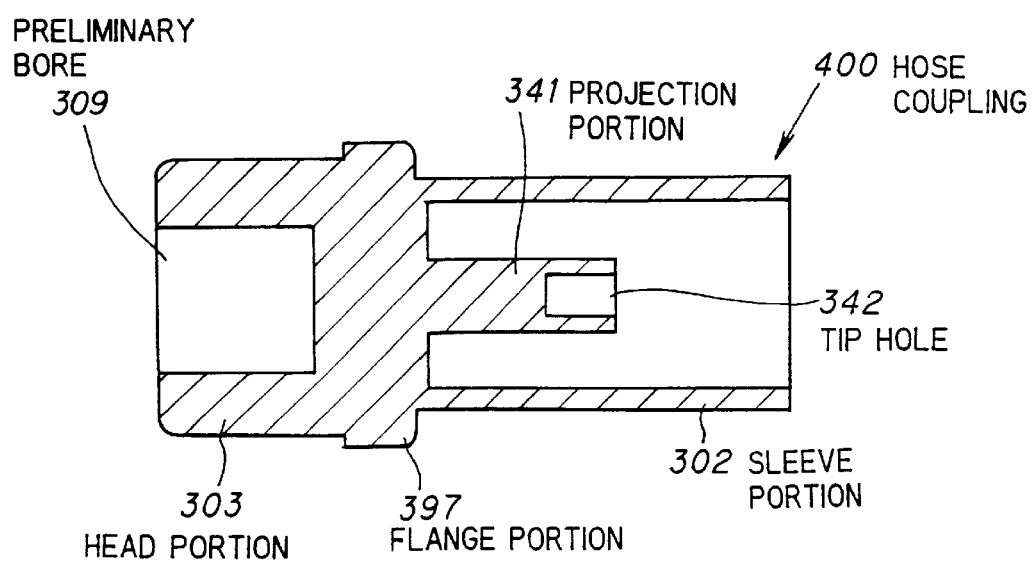

FIG. 24 shows an intermediate blank material in a eleventh preferred embodiment according to the invention, wherein a tip hole 342 and a flange portion 397 are provided in advance.

Figure 25:
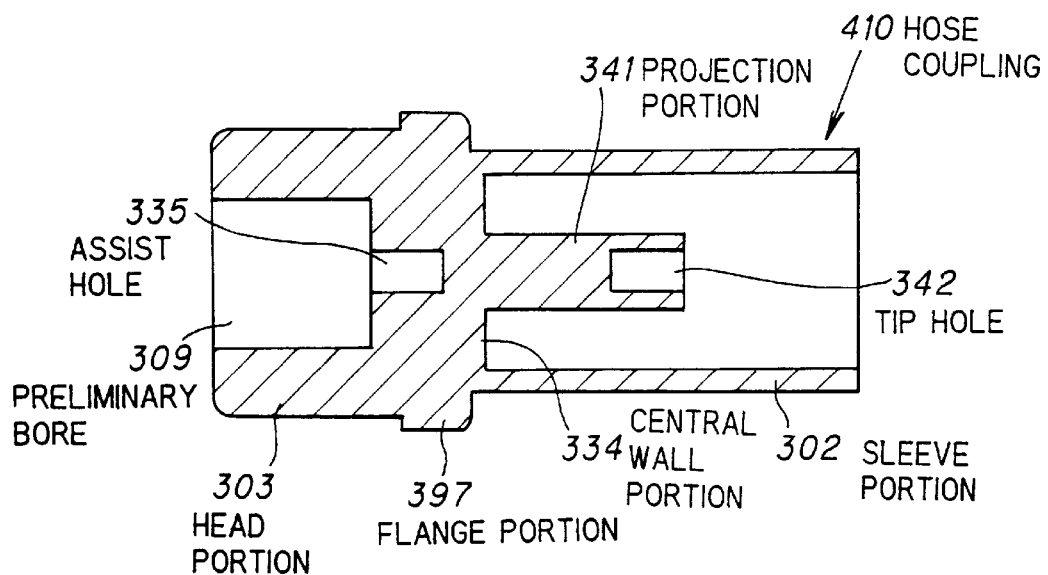

FIG. 25 shows an intermediate blank material in a twelfth preferred embodiment according to the invention, wherein an assist hole, a tip hole 342 and a flange portion 397 are provided in advance.

Figure 26:
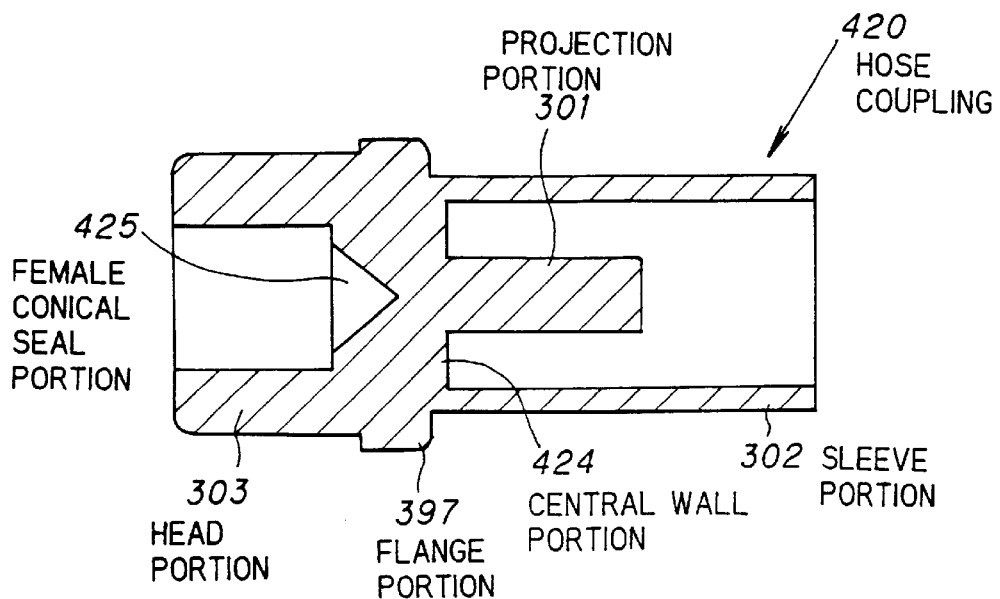

FIG. 26 shows an intermediate blank material in a thirteenth preferred embodiment according to the invention, wherein a female conical seal portion 425 is provided at the bottom of a bore of the head portion 303, a flange portion 397 is provided in its periphery. The female seal portion 425 may be preferable formed by cutting for longer life of a punch of a punch former to be used afterward. According to the embodiment, the central wall portion is thinner near the axis where punching is performed, whereby the punching thereof becomes easier. In the embodiment, the flange portion may be optional.

Figure 27:
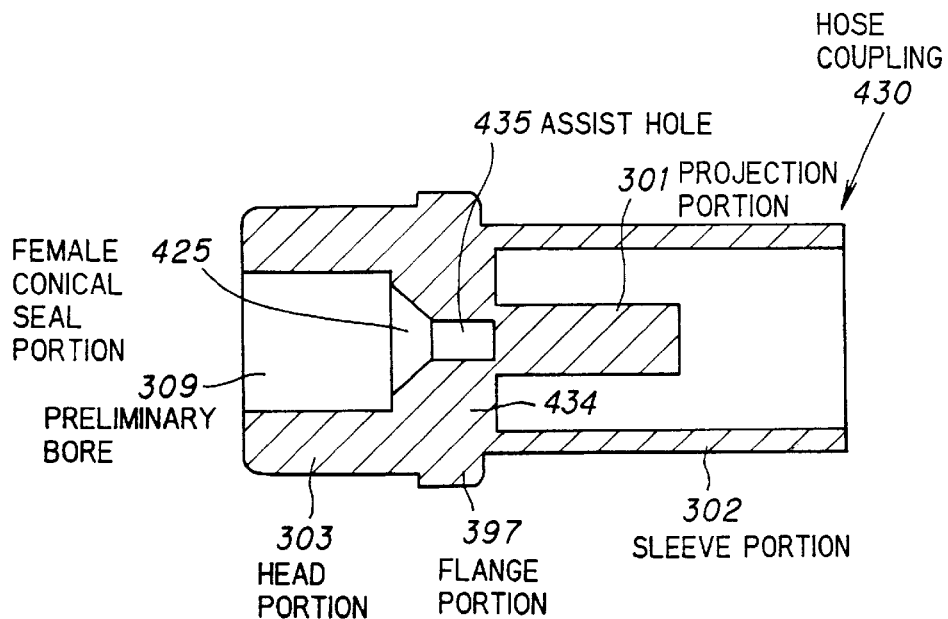

FIG. 27 shows an intermediate blank material in a fourteenth preferred embodiment according to the invention, wherein a female conical seal portion 425 is further provided with an assist hole 435 which corresponds to an axial bore, which is as deep as the bottom thereof almost reaches the surface of the central wall portion 434. According to the embodiment, punching of the central wall portion becomes much easier.

Figure 28:
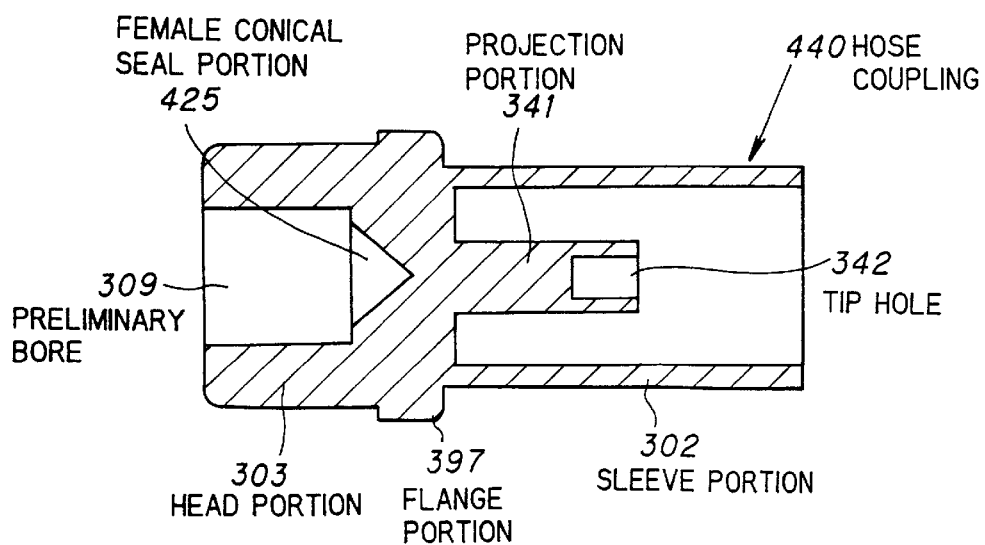

FIG. 28 shows an intermediate blank material in a fifteenth preferred embodiment according to the invention, wherein a female conical seal portion 425, a tip hole 342 and an annular flange portion 397 are provided.

Figure 29:
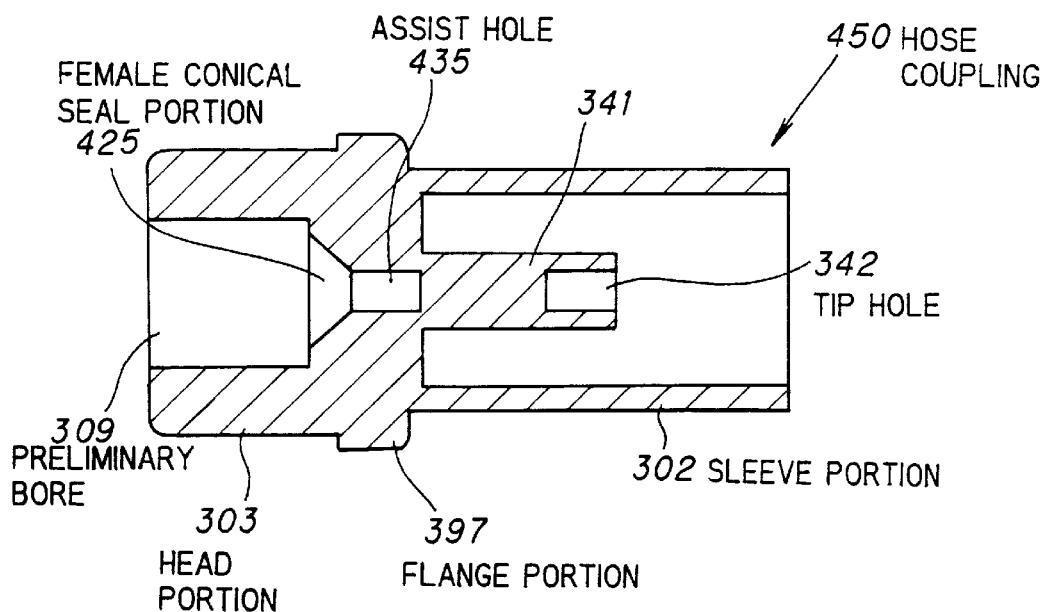

FIG. 29 shows an intermediate blank material in a sixteenth preferred embodiment according to the invention, wherein a female conical seal portion 425 having an assist hole 435, a tip hole 342 and an annular flange portion 397 are provided.

Figure 30:
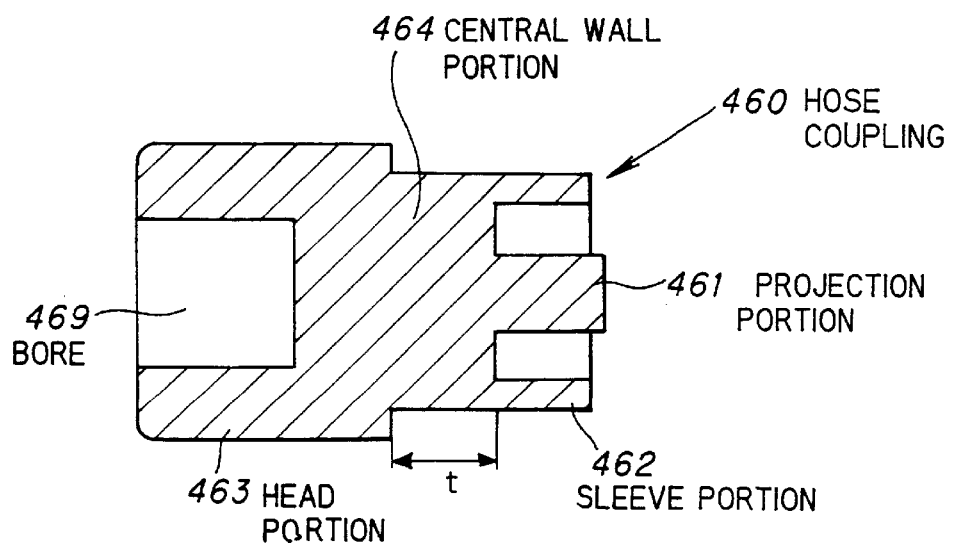

FIG. 30 shows an intermediate blank material in a seventeenth preferred embodiment according to the invention, wherein a central wall portion is thicker than in the aforementioned embodiment by a thickness t, and a projection portion 461 extrudes above the end surface of a sleeve portion, both projection portion 461 and sleeve portion 462 are shorter than in the aforementioned embodiment. For manufacturing a hose coupling using the embodiment, a nipple portion is formed by plastic deformation through backward extrusion, and at the same time, the nipple portion and the sleeve portion extend backward in tubular form by deformation of the thick portion (t) of the central wall portion 464.

Figure 31:
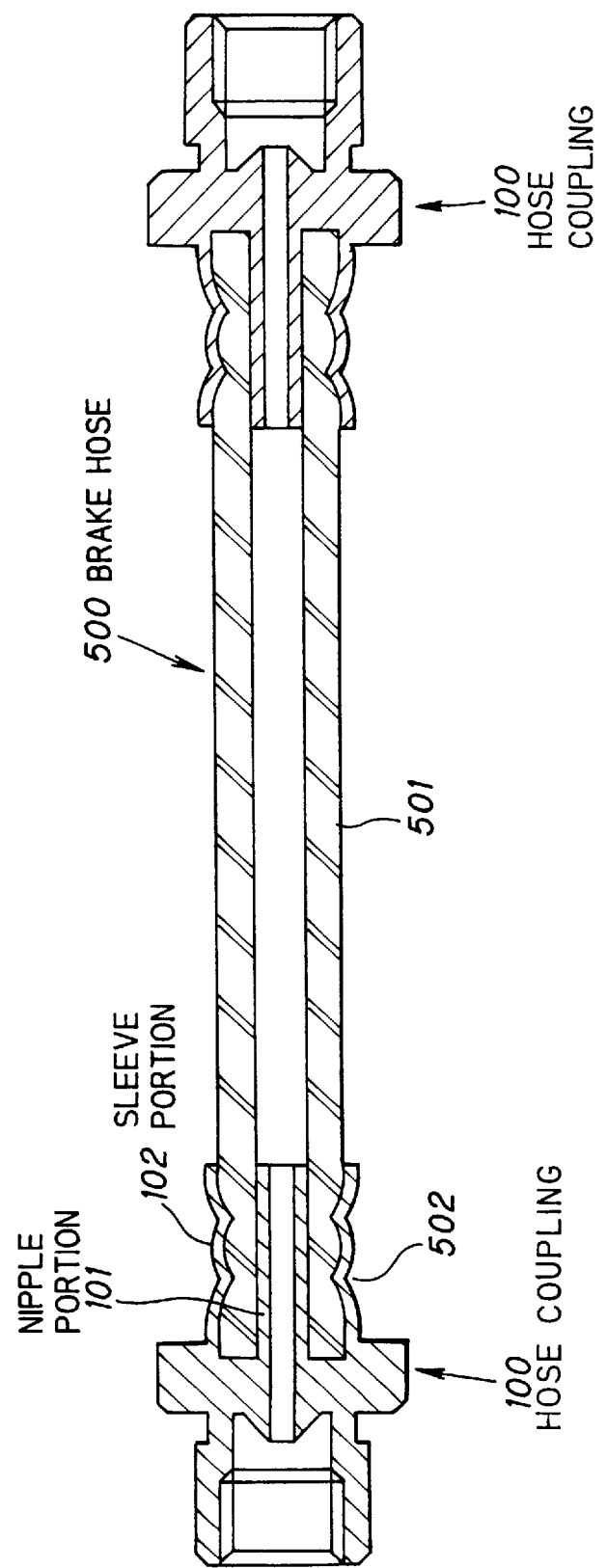

FIG. 31 shows a hose assembly in a preferred embodiment according to the invention. Hose couplings 100 are attached to both end of a hose member 501 by inserting each end into a receiving pocket formed between a nipple portion 101 and a sleeve portion 102. The sleeve portion is crimped, as at 502, tightly around the end of the hose member 501, then the hose assembly 500 is obtained.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A method of manufacturing a hose coupling from an intermediate blank material, said intermediate blank material comprising a cylindrical projection portion; a tubular sleeve portion axially extending over said projection portion, said sleeve portion being longer than the projection portion in their axial lengths; and a head portion, to one end of which said projection portion and said sleeve portion are joined; wherein said projection portion, said sleeve portion and said head portion are formed from one material; said method comprising plastically deforming said projection portion of the intermediate blank material to form a tubular nipple portion having a hardness greater than a hardness of said sleeve portion, and an outer diameter of the projection portion is substantially the same as an outer diameter of the nipple portion formed by plastically deforming the projection portion, and a volume of the projection portion is substantially the same as a volume of the nipple portion formed by plastically deforming the projection portion.

2. A method of manufacturing a hose coupling from an intermediate blank material, said intermediate blank material comprising a cylindrical projection portion; a tubular sleeve portion axially extending over said projection portion, said sleeve portion being longer than the projection portion in their axial lengths; and a head portion, to one end of which said projection portion and said sleeve portion are joined; wherein said projection portion, said sleeve portion and said head portion are formed from one material; said method comprising annealing said intermediate blank material under predetermined thermal conditions; and plastically deforming said projection portion of the annealed intermediate blank material to form a tubular nipple portion having a hardness greater than a hardness of said sleeve portion, and an outer diameter of the projection portion is substantially the same as an outer diameter of the nipple portion formed by plastically deforming the projection portion, and a volume of the projection portion is substantially the same as a volume of the nipple portion formed by plastically deforming the projection portion.

3. A method of manufacturing a hose coupling from an intermediate blank material, according to claim 1 or claim 2, wherein said intermediate blank material is formed by a plastic deformation of a blank material.

4. A method of manufacturing a hose coupling from an intermediate blank material, according to claim 3, wherein said plastic deformation of said projection portion includes the deformation of said head portion to form an annular flange in its periphery.

5. A method of manufacturing a hose coupling from an intermediate blank material, according to claim 3, wherein said plastic deformation of said blank material includes the formation of a preliminary bore in an opposite side of the head portion to the projection portion.

6. A method of manufacturing a hose coupling from an intermediate blank material, according to claim 3, wherein said plastic deformation of said blank material includes the formation of a hole at the bottom of the preliminary bore in the head portion or at the tip of the projection portion.

7. A method of manufacturing a hose coupling from an intermediate blank material, according to claim 3, wherein said plastic deformation of said blank material includes the formation of a conical seal portion at the bottom of the preliminary bore provided in the head portion.

8. A method of manufacturing a hose coupling from an intermediate blank material, according to claim 1 or claim 2, wherein said plastic deformation of said projection portion of the intermediate blank material is performed by backward extrusion.

9. A method of manufacturing a hose coupling from an intermediate blank material according to claim 2, wherein said tubular nipple portion has a hardness between approximately 160 Hv and 240 Hv and wherein said sleeve portion has a hardness less than approximately 150 Hv.

10. A method of manufacturing a hose coupling from an intermediate blank material according to claim 2, wherein said tubular nipple portion has a hardness between 170 Hv and 180 Hv and wherein said sleeve portion has a hardness between 90 Hv and 150 Hv.

11. A method of manufacturing a hose coupling from an intermediate blank material, said intermediate blank material comprising a cylindrical projection portion; a tubular sleeve portion axially extending over said projection portion; said sleeve portion being longer than the projection portion in their axial lengths; and a head portion, to one end of which said projection portion and said sleeve portion are joined; wherein said projection portion, said sleeve portion and said head portion are formed from one material; said method comprising forming the intermediate blank material by plastically deforming a blank material; plastically deforming said projection portion to form a tubular nipple portion having a hardness greater than a hardness of said sleeve portion; and punching through the head portion along the nipple portion and toward a preliminary bore to form an axial bore in the intermediate material, and an outer diameter of the projection portion is substantially the same as an outer diameter of the nipple portion formed by plastically deforming the projection portion, and a volume of the projection portion is substantially the same as a volume of the nipple portion formed by plastically deforming the projection portion.

12. A method of manufacturing a hose coupling from an intermediate blank material according to claim 11, further comprising forming a bore corresponding to an axial bore of said tubular nipple potion at said head portion.

13. A method of manufacturing a hose coupling from an intermediate blank material according to claim 12, said forming a bore comprising forming said tubular nipple portion and extruding an axial bore of said tubular nipple portion to said head portion.

14. A method of manufacturing a hose coupling from an intermediate blank material, according to claim 11, wherein the punching operation is performed just after the formation of the nipple portion.

15. A method of manufacturing a hose coupling from an intermediate blank material according to claim 11, wherein said tubular nipple portion has a hardness between approximately 160 Hv and 240 Hv and wherein said sleeve portion has a hardness less than approximately 150 Hv.

16. A method of manufacturing a hose coupling from an intermediate blank material according to claim 11, wherein said tubular nipple portion has a hardness between 170 Hv and 180 Hv and wherein said sleeve portion has a hardness between 90 Hv and 150 Hv.

17. A method of manufacturing a hose coupling from an intermediate blank material, said intermediate blank material comprising a cylindrical projection portion; a tubular sleeve portion axially extending over said projection portion, said sleeve portion being longer than the projection portion in their axial lengths; and a head portion, to one end of which said projection portion and said sleeve portion are joined; wherein said projection portion, said sleeve portion and said head portion are formed from one material; said method comprising forming the intermediate blank material by plastically deforming a blank material; annealing the intermediate blank material under predetermined conditions; plastically deforming said projection portion to form a tubular nipple portion having a hardness greater than a hardness of said sleeve portion; and punching through the head portion along the nipple portion and toward a preliminary bore to form an axial bore in the intermediate material, and an outer diameter of the projection portion is substantially the same as an outer diameter of the nipple portion formed by plastically deforming the projection portion, and a volume of the projection portion is substantially the same as a volume of the nipple portion formed by plastically deforming the projection portion.

18. A method of manufacturing a hose coupling from an intermediate blank material, according to claim 17, wherein said plastic deformation of said blank material includes the formation of the preliminary bore in an opposite side of the head portion to the projection portion.

19. A method of manufacturing a hose coupling from an intermediate blank material, according to claim 18, wherein a conical seal portion is formed at the bottom of the preliminary portion provided in the head portion concurrent with the punching operation.

20. A method of manufacturing a hose coupling from an intermediate blank material according to claim 17, further comprising forming a bore corresponding to an axial bore of said tubular nipple potion at said head portion.

21. A method of manufacturing a hose coupling from an intermediate blank material according to claim 20, said forming a bore comprising forming said tubular nipple portion and extruding an axial bore of said tubular nipple portion to said head portion.

22. A method of manufacturing a hose coupling from an intermediate blank material according to claim 17, wherein said tubular nipple portion has a hardness between approximately 160 Hv and 240 Hv and wherein said sleeve portion has a hardness less than approximately 150 Hv.

23. A method of manufacturing a hose coupling from an intermediate blank material according to claim 17, wherein said tubular nipple portion has a hardness between 170 Hv and 180 Hv and wherein said sleeve portion has a hardness between 90 Hv and 150 Hv.

* * * * *